United States Patent [19]
Luh et al.

[11] Patent Number: 5,715,165
[45] Date of Patent: Feb. 3, 1998

[54] METHOD AND SYSTEM FOR SCHEDULING USING A FACET ASCENDING ALGORITHM OR A REDUCED COMPLEXITY BUNDLE METHOD FOR SOLVING AN INTEGER PROGRAMMING PROBLEM

[75] Inventors: Peter B. Luh, Storrs; Robert N. Tomastik, Manchester, both of Conn.

[73] Assignee: The University of Connecticut, Storrs, Conn.

[21] Appl. No.: 363,216

[22] Filed: Dec. 23, 1994

[51] Int. Cl.$^6$ ................................................ G06F 19/00
[52] U.S. Cl. ........................ 364/474.15; 364/468.09; 364/468.06; 364/153
[58] Field of Search .................... 364/468.09, 140, 364/141, 148, 152, 153, 468.01, 468.03, 468.05, 468.06, 474.15; 395/208, 209

[56] References Cited

U.S. PATENT DOCUMENTS

| | | | |
|---|---|---|---|
| 5,077,661 | 12/1991 | Jain et al. | 364/402 |
| 5,093,794 | 3/1992 | Howie et al. | 364/468 |
| 5,155,679 | 10/1992 | Jain et al. | 364/468.13 |
| 5,195,172 | 3/1993 | Elad et al. | 395/50 |
| 5,216,593 | 6/1993 | Dietrich et al. | 364/402 |
| 5,233,533 | 8/1993 | Edstrom et al. | 364/401 |

OTHER PUBLICATIONS

R.N. Tomastik et al, "The Facet Ascending Algorithm for Integer Programming Problems", IEEE Proceedings, Dec. 1993.

P.B. Luh et al, "Schedule Generation and Reconfiguration for Parallel Machine", IEEE Transactions on Robotics and Automation, vol. 6, No. 6, Dec. 1990, pp. 687–696.

M.L. Fisher, "The Lagrangian Relaxation method For Solving Integer Programming Problems", The Institute of Management Sciences, Jan. 1981, pp. 1–18, vol. 27, No. 1, Jan. 1981.

A. R. Conn et al, "A Projection Method For The Uncapacitated Facility Location Problem", Mathmatical Programming 46 (1990) pp. 273–298.

R. N. Tomastick et al, "A New Lagrangian Relaxation Algorithm For Scheduling Of Manufacturing Systems", NSF Proceedings, 1994.

*Primary Examiner*—Paul P. Gordon
*Attorney, Agent, or Firm*—Fishman, Dionne, Cantor & Colburn

[57] ABSTRACT

A method and system for scheduling using a facet ascending algorithm or a reduced complexity bundle method for solving an integer programming problem is presented. A Lagrangian dual function of an integer scheduling problem is maximized (for a primal minimization problem) to obtain a good near-feasible solution, and to provide a lower bound to the optimal value of the original problem. The dual function is a polyhedral concave function made up of many facets. The facet ascending algorithm of the present invention exploits the polyhedral concave nature of the dual function by ascending facets along intersections of facets. At each iteration, the algorithm finds the facets that intersect at the current dual point, calculates a direction of ascent along these facets, and then performs a specialized line search which optimizes a scaler polyhedral concave function in a finite number of steps. An improved version of the facet ascending algorithm, the reduced complexity bundle method, maximizes a nonsmooth concave function of variables. This is accomplished by finding a hyperplane separating the origin and the affine manifold of a polyhedron. The hyperplane also separates the origin and the polyhedron since the polyhedron is a subset of its affine manifold. Then an element of the bundle is projected onto the subspace normal to the affine manifold to produce a trial direction normal. If the projection is zero (i.e., indicating the affine manifold contains the origin), a re-projection onto the subspace normal to the affine manifold of an appropriate face of the polyhedron gives a trial direction. This reduced complexity bundle method always finds an ε-ascent trial direction or detects an ε-optimal point, thus maintaining global convergence. The method can be used to maximize the dual function of a mixed-integer scheduling problem.

39 Claims, 7 Drawing Sheets

METHOD AND SYSTEM FOR SCHEDULING USING A FACET ASCENDING ALGORITHM OR A REDUCED COMPLEXITY BUNDLE METHOD FOR SOLVING AN INTEGER PROGRAMMING PROBLEM

BACKGROUND OF THE INVENTION

The present invention generally relates to scheduling a sequence of events which are subject to a plurality of constraints. More particularly, the present invention relates to scheduling a sequence of events which are subject to a plurality of constraints by modeling the scheduling problem as an integer programming problem which is resolved using a facet ascending algorithm or a reduced complexity bundle method.

Many large-scale optimization problems, such as scheduling a manufacturing system, can be modeled as separable integer programming problems, and Lagrangian relaxation is a popular method for obtaining near-optimal solutions to them. In this method, the complicating constraints coupling different decision variables are relaxed by using Lagrange multipliers, and the original difficult problem is decomposed into subproblems that are easier to solve. The Lagrangian dual function is then formed which is a function of the Lagrange multipliers. By iteratively updating the multipliers to maximize (i.e., for a primal minimization problem) the dual function, the decision variables found from solving the subproblems tend to an optimal feasible solution while the dual function itself provides a lower bound to the optimal primal cost. The Lagrangian relaxation method has been used to solve scheduling problems, location problems, assignment problems, and set coveting problems, among others.

The most commonly used approach for optimizing the dual function of an integer programming problem (the dual function in this case is nondifferentiable) is the subgradient method, such as described in an article entitled "The Lagrangian Relaxation Method For Solving Integer Programming Problems", by M. L. Fisher, Mgmt. Sci 27, 1–18, 1981. This method can be used to optimize any convex or concave nondifferentiable function. Several modified versions of the subgradient method have been presented. Recent applications of the subgradient method include job shop scheduling, where the standard subgradient method is used; scheduling with bills of materials, where the modified subgradient method is used; and discrete lot sizing and scheduling with setup times, where the standard subgradient method is used.

Although the subgradient method is often used to maximize the dual function, the method may converge slowly under certain conditions. Referring to FIG. 4 herein, the trajectories generated by the subgradient method are overlaid on the contours of a dual function to be maximized. It will be noted that the trajectories zigzag across an edge of the function, causing slow convergence. This behavior is very common when the method (or a variation of it such as the modified subgradient method) is used and the dual function contains many edges such as the one in FIG. 5.

Examples of other optimization methods for resolving scheduling problems can be found in U.S. Pat. Nos. 5,195,172 and 5,216,593. U.S. Pat. No. 5,195,172 ('172) discloses a system and method which utilizes an object-oriented approach for representing the problem and rule-based and optimization-based methods for solving problems. However, the system and method of the '172 patent does not converge to an optimal solution and requires excess amounts of time. U.S. Pat. No. 5,216,593 disclosed an optimization technique which requires excessive amounts of time for problems of reasonable size.

As mentioned in the '172 patent, scheduling problems are also approached using a rule-based method. Examples of such rule-based methods are found in U.S. Pat. Nos. 5,093,794 and 5,233,533. In general, rule-based methods generate schedules very quickly. However, the quality of the resulting schedules with respect to best possible, or optimal, schedule is not known, and poor schedules can result.

SUMMARY OF THE INVENTION

The above-discussed and other drawbacks and deficiencies of the prior art are overcome or alleviated by the method and system for scheduling using a facet ascending algorithm or a reduced complexity bundle method for solving an integer programming problem of the present invention.

In accordance with a first embodiment the present invention, the facet ascending algorithm optimizes a dual function of an integer program. A facet ascending algorithm is used to optimize the Lagrangian dual function of separable integer programming problems which define a scheduling problem. The present invention significantly reduces the calculation/processing time to provide near-optimal solutions, making the present invention a practical solution to complex scheduling problems. The facet ascending algorithm exploits the geometry of the dual function by recognizing that it is a polyhedral concave function made up of many facets. Instead of bouncing between facets as the prior art subgradient method does, the facet ascending algorithm calculates the intersection of adjacent facets and moves along the facets on such an intersection. The equation of each facet can be easily computed using the gradient of each facet and a point on each facet. The edge is then computed as the intersection of the two facets. To determine which direction to move on this edge, a gradient of one of the facets is projected onto the edge. Multipliers are updated by moving them directly along the edge using a line search technique. These same principles can be extended to higher dimensional dual functions.

The dual function of an integer programming problem is formed by relaxing constraints using Lagrange multipliers. For this method to be effective, the multipliers should decouple some or all of the decision variables such that the original problem can be decomposed into subproblems that are easier to solve. The important features of a dual function are that the function consists of multiple facets, is nondifferentiable, and is concave.

The facet ascending algorithm exploits the polyhedral concave nature of the dual function by ascending the intersection of multiple facets. First, given an initial point and direction, a line search is performed which updates the multipliers and places them on another intersection of multiple facets. The multipliers at each iteration must land exactly on an intersection of facets so that the facets can be ascended along the intersection. Finding an exact optimal line search value in a finite number of steps so that the multipliers will land exactly on an intersection of facets is difficult. Then, the facets that intersect at the newly updated point are found. The number of possible facets grows exponentially with problem size. This limitation is overcome by identifying intersecting facets through evaluation the dual function values at points in the neighborhood of the current point. After a sufficient number of intersecting facets are found, a direction of ascent along the intersection of facets is computed by projecting the gradient of one of the facets onto the intersection. When the projection is zero before the maximal is reached, which occurs when the newly updated multipliers correspond to a maximum point within the intersection of the facets, a non-ascendable facet is identified. Then a direction of ascent is computed by re-projecting a gradient onto the intersection of all the facets except the nonascendable one. Repeating the initial step, the facets are ascended by performing a line search along the direction of ascent. The above steps are repeated until a stopping criteria is met.

A method disclosed in an article entitled "A Projection Method For The Uncapacitated Facility Location Problem", by Conn and Cornuejols, Mathematical Programming 46, 1990, pp. 273–298, computes a direction using a projection method similar to that of the present invention. However, unlike the present invention, this prior art method assumes all facets at a point are known (e.g., as is the case for the uncapacitated facility location problem). Consequently, the prior art method is not suitable for solving manufacturing scheduling problems of the type described herein.

The line search seeks to find an optimal value along a direction of ascent from a point, and is equivalent to the problem of finding the maximum of a scaler polyhedral concave function. This novel line search method finds the maximum in a finite number of iterations by recognizing that there exists an optimal value at the intersection of two line segments of the function. The new line search takes advantage of the fact that an optimum occurs at the intersection of two adjacent line segments.

The stopping criteria used depends on the application. For example, when an optimal dual point is detected. However, some time-critical applications may require the algorithm to stop before an optimal dual solution is found. For example, the algorithm can be programmed to stop when the duality gap, the difference between the current primal feasible cost (obtained from a heuristic or a feasible solution to the subproblems) and the current dual cost, is less than some value. The algorithm can also be stopped after a fixed number of iterations.

The solution to the subproblems is rarely a feasible solution to the primal problem. Therefore, a heuristic is usually needed to obtain a feasible primal solution. The heuristic is typically problem dependent and incorporates simple rules for converting the infeasible subproblem to a feasible primal solution.

In accordance with a second embodiment of the present invention, an improved version of the facet ascending algorithm for resolving an unconstrained maximum of a nonsmooth concave function is presented. The function is Lipschitzian, whereby all subgradients are finite, the subdifferential exists everywhere, and the subdifferential is a nonempty compact convex set. The prior art resolved the above using the subgradient, cutting plane, or bundle method. The bundle method, the method most relevant to this embodiment, approximates the $\epsilon$-subdifferential at each iteration point using the convex hull of $\epsilon$-subgradients previously computed and stored in a so-called "bundle". For a given approximation of the convex hull (which is polyhedron), the bundle method computes an approximate $\epsilon$-ascent direction by finding a hyperplane separating the origin and the convex hull. If the convex hull contains the origin (whereby there is no separating hyperplane), then the algorithm has found an $\epsilon$-optimal point. The large number of computations required to compute a direction limits the practicality of the prior art bundle methods to small problems, despite the method's good convergence property.

In accordance with this embodiment of the present invention, a reduced complexity bundle method is presented which computes a trial direction by projecting a subgradient onto the subspace normal to the affine manifold of the convex hull. If the projection is zero, then the affine manifold contains the origin and a computationally simple $\epsilon$-optimality test determines if the convex hull contains the origin. If the convex hull does not contain the origin, a trial direction is computed by re-projecting any subgradient of the bundle onto the subspace normal to the affine manifold of an appropriate face of the convex hull. This method will always find an $\epsilon$-ascent trial direction or detects an $\epsilon$-optimal point, thus maintaining global convergence of the bundle method. A significant improvement of the method of the present invention, is the reduction in computational time in finding a direction, thus making the bundle method of the present invention much faster, especially for large problems than that of the prior art. The method can also be used to maximize the dual function of a mixed-integer scheduling problem, e.g., the unit commitment and economic dispatch of a power system, where the dual function is nonsmooth and concave.

Prior to describing the improvement of the present invention, the prior art bundle method is described. The prior art bundle methods employ a concept referred to as $\epsilon$-subdifferential, which is the union of all subgradients at points in a neighborhood of a current iteration point. Using the concept of an $\epsilon$-subdifferential, the bundle method seeks an $\epsilon$-ascent direction.

The availability of only one subgradient at each point implies unavailability of the complete $\epsilon$-subdifferential. The unavailability of the $\epsilon$-subdifferential resulted in the bundle idea. In summary, at each iteration, accumulate $\epsilon$-subgradients of the iterate in a bundle, and substitute for the $\epsilon$-subdifferential the convex hull of the elements in the bundle. The set of the convex hull provides an inner polyhedral approximation to the $\epsilon$-subdifferential, and the bundle method iteratively adds to bundle until the convex hull is a sufficient approximation. The prior art bundle method basically followed the following four steps.

(1) At a new iteration point, initialize the bundle.

(2) For any given bundle and corresponding convex hull, obtain a hyperplane separating the origin and the convex hull, where the normal to the hyperplane yields a trial direction.

(3) After computation of a trial direction, determine if d is an $\epsilon$-ascent direction.

(4) If d is an $\epsilon$-ascent direction, update the iteration point and go to step (1) above. Otherwise, find a subgradient and add such a subgradient to the bundle to improve the convex hull and go to step (2) above. Repeat the process until the convex hull contains the origin.

Computing a trial direction in step (2) involves solving a quadratic programming subproblem to obtain subgradient multipliers, and involves computing the linear combination of the subgradients, each weighted by its respective multiplier, to obtain the direction.

The improvement of the present invention, lies in a new step (2), whereby steps (1), (3) and (4) in the present invention are the same as described above with regard to the prior art. The new step (2)' comprises three parts as follows.

(2a)' Find a hyperplane separating the origin and the affine manifold A of the convex hull, and project any subgradient of the bundle onto A' the subspace normal to A. If the projection direction is not zero, go to step (3).

(2b)' If the projection is zero (indicating the affine manifold contains the origin), perform an $\epsilon$-optimality test to determine if the convex hull contains the origin. If the convex hull contains the origin, then stop.

(2c)' If the projection is zero and the convex hull does not contain the origin, compute a trial direction by re-projecting any subgradient of the bundle onto the subspace normal to the affine manifold of an appropriate face of the convex hull. Check for degeneracy of the projection direction. If not degenerate, go to step (3); otherwise, use a recursion relation to compute a valid direction and go to step (3) or detect an $\epsilon$-optimal point and stop.

A problem arises with the occurrence of a zero projection when the current iteration point is not at an $\epsilon$-optimal point. In order to resolve this problem, a re-projection onto the subspace normal to the affine manifold of a face of the convex hull produces a trial direction. After a zero projection and re-projection as described above, any subsequent additions to the bundle can cause the bundle to contain affine dependent subgradients. To resolve the problem of affine dependence of some bundle, the objective is to express the affine manifold in terms of an affine independent subset of the bundle and then project onto the affine manifold as before. To this end, the bundle is split into two "sub-bundles": a set of affine independent subgradients and dependent subgradients. Sub-bundles are initialized after the first zero projection of the current iteration, where a new subgradient is added to the bundle. The next steps to follow are the same as before.

Another complication that the method of the present invention may encounter is degeneracy. In the unusual case that degeneracy occurs, a direction is found by solving a linear program.

The reduced complexity bundle method of the present invention reduces the number of computations in finding a hyperplane separating the origin and the convex hull of the bundle elements. The reduced complexity in finding a separating hyperplane makes the bundle method of the present invention much faster than the prior art bundle methods, especially for large problems. The present invention includes an $\epsilon$-optimality test and maintains global convergence. The method can also be used to maximize the dual function of a mixed-integer scheduling problem, e.g., the unit commitment and economic dispatch of a power system, where the dual function is nonsmooth and concave.

In accordance with the present invention, a method for scheduling a sequence of events which are subject to a plurality of constraints employs one of the above embodiments. The events are scheduled in accordance with the determined schedule. The calculations are preferably performed on a computer as discussed hereinbefore. Further, the computer may be connected to robotics or other automation systems, whereby the scheduling is perform automatically in accordance with the determined schedule. The determined schedule may also be displayed on a computer screen for implementation by, for example manufacturing personnel. The method of the present invention may also be implemented to re-schedule a sequence of events when a constraint or situation changes unexpectantly.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES:

FIGS. 3A-C are charts illustrating results using Lagrangian relaxation wherein FIG. 3A illustrates relaxation, FIG. 3B illustrates solving subproblems and FIG. 3C illustrates adjusting prices iteratively;

DESCRIPTION OF THE PREFERRED EMBODIMENT

Figure 1:
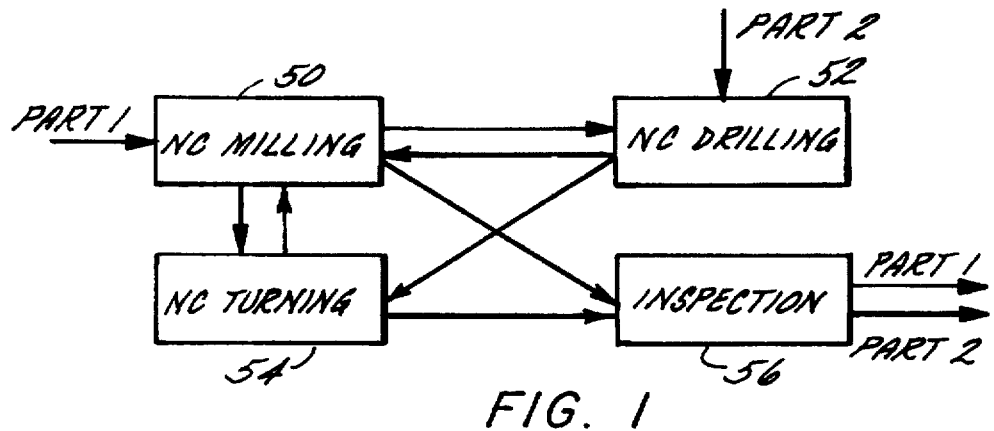
FIG. 1 is a diagrammatic view of a machining process.
Figure 2A:
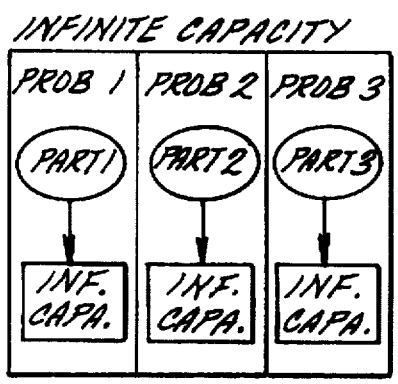
FIG. 2A is a diagrammatic view of an ideal manufacturing situation.
Figure 2B:
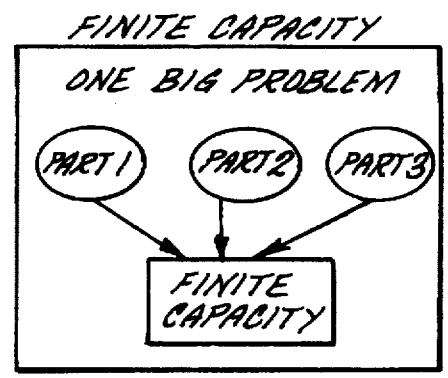
FIG. 2B is a diagrammatic view of a typical manufacturing situation.
Figure 2C:
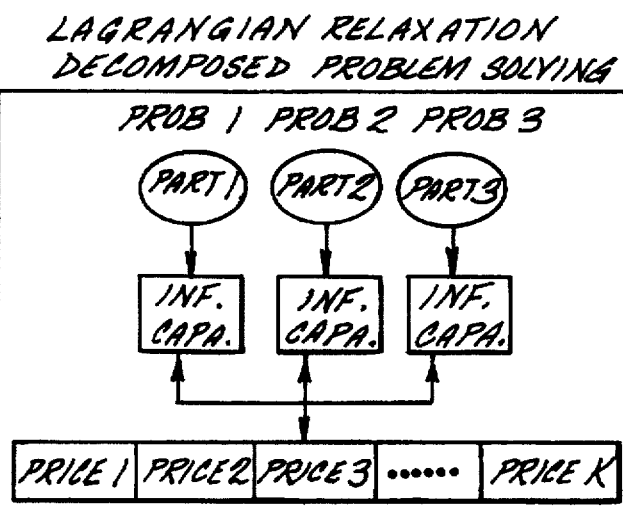
FIG. 2C is a diagrammatic view of a manufacturing situation resolved using Lagrangian relaxation.
Figure 3A:
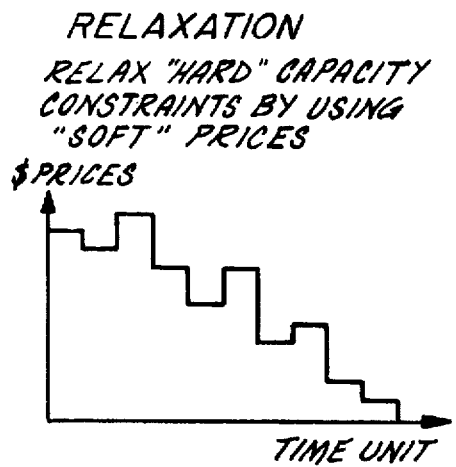
Figure 3B:
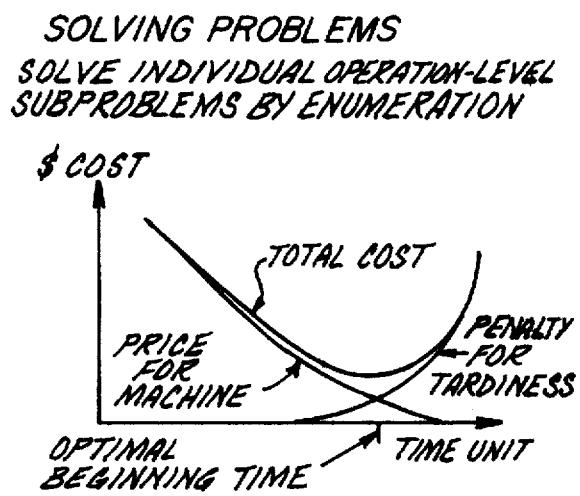
Figure 3C:
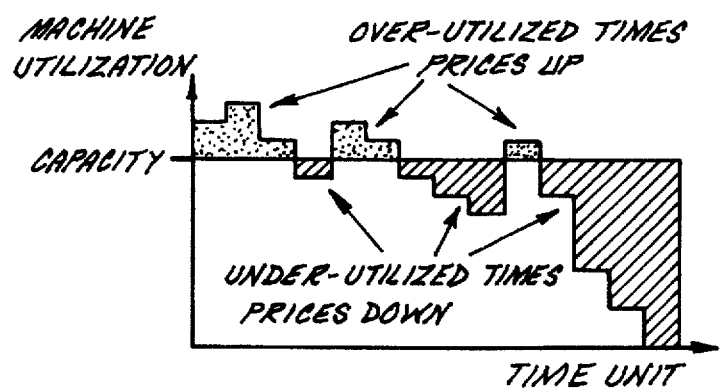

The present invention is applicable to scheduling, including integer scheduling problems and mixed-integer scheduling problems. Referring to FIG. 1, for example, a machining process is diagrammatically illustrated. A first part (Part 1) proceeds to NC milling (block 50), then to NC drilling (block 52), then to NC turning (block 54), then back to NC milling and finally to inspection (block 56). A second part (Part 2) proceeds to NC drilling, then to NC milling, then to NC turning and finally to inspection. Each part will spend various times at each station and if not properly scheduled, this will result in inefficient manufacturing and increased cost. Ideally each part would have access to dedicated stations having infinite capacity, as is shown in FIG. 2A, whereby there is no need to schedule. However, such is not a practical solution. More typically, is the situation shown in FIG. 2B where a plurality of parts are competing for access to stations having finite capacity presenting difficult scheduling problems. Referring to FIG. 2C, Lagrangian relaxation is a method of obtaining near-optimal solutions to large-scale separable integer programming problems, such as are encountered in most scheduling situations. Lagrangian relaxation is discussed more fully hereinafter. By way of example, a computer suitable for such large scale processing is a SUN Sparcstation 10. Further, examples of Lagrangian relaxation are shown in FIGS. 3A-C. FIG. 3A illustrates relaxing so called "hard" capacity constraints by using so called "soft" prices. FIG. 3B illustrates solving individual operation-level subproblems by enumeration. FIG. 3C illustrates performing market-economy price adjustments.

Figure 4:
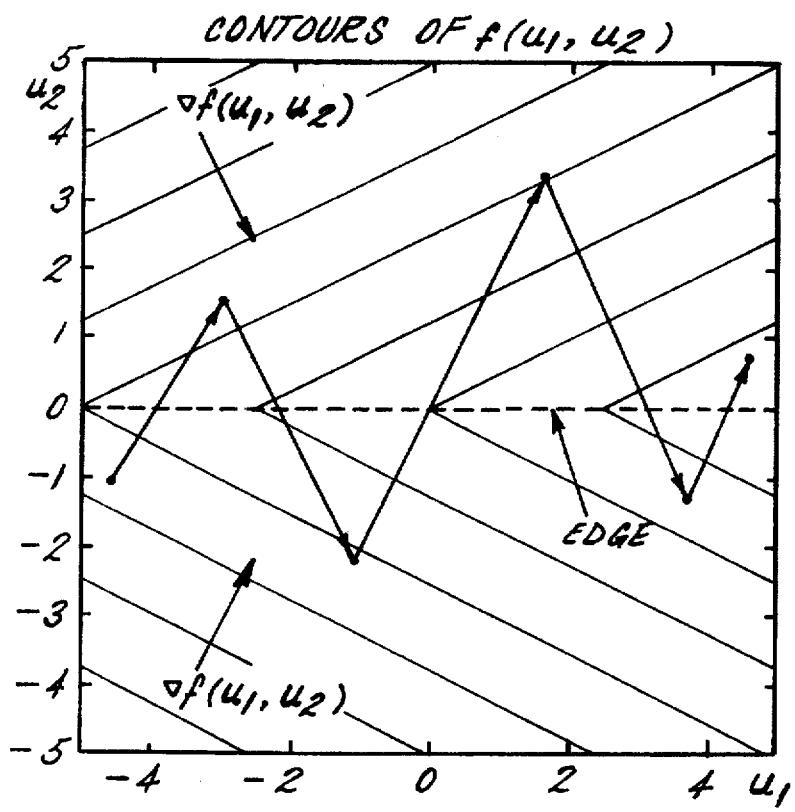
FIG. 4 is a plot illustrating a plurality of facets and a diagrammatic example of the prior art subgradient method.

The present invention employs a facet ascending algorithm to optimize the Lagrangian dual function of separable integer programming problems, and is related to the price adjustment step of FIG. 3C. This method significantly reduces the calculation/processing time to provide near-optimal solutions, making the method of the present invention a practical solution to complex scheduling problems. The facet ascending algorithm exploits the geometry of the dual function by recognizing that it is a polyhedral concave function made up of many facets. Instead of bouncing between facets as the prior art subgradient method does (shown in FIG. 4), the facet ascending algorithm calculates the intersection of adjacent facets and moves along the facets on such an intersection. Referring to FIG. 4, the equation of each facet can be easily computed using the gradient of each facet and a point on each facet. The edge is then computed as the intersection of the two facets. To determine which direction to move on this edge, a gradient of one of the facets is projected onto the edge. Multipliers are updated by moving them directly along the edge using a line search technique. These same principles can be extended to higher dimensional dual functions, as will be shown.

The separable integer programming problem formulation, the Lagrangian relaxation framework, and the geometry of the dual function are described below. The dual function of an integer programming problem is formed by relaxing constraints using Lagrange multipliers. For this method to be effective, the multipliers should decouple some or all of the decision variables such that the original problem can be decomposed into subproblems that are easier to solve. Referring to Table I below a simple example of a separable and a nonseparable problem is presented. It will be appreciated from Table I, that computing $J_{LR}^n(u)$ for a fixed u is not easier than solving the original primal problem. However, computing $J_{LR}^s(u)$ for a fixed u by solving the subproblems is easier to solve than the primal problem because $x_1$ and $x_2$ are decoupled.

TABLE I

| A non-separable problem (P1) and a separable problem (P2) | |
|---|---|
| P1 | |
| Decision variables | $x_1, x_2 \in \{-5, -4, \ldots, 4, 5\}$ |
| Objective | $\min \{cx_1^2 x_2^3\}$ |
| Constraint | $ax_1 + b\sqrt{x_2} = 0$ |
| Dual function | $J_{LR}^n(u) = \min_{x_1, x_2} \{cx_1^2 x_2^3 + u(ax_1 + b\sqrt{x_2})\}$ |
| Subproblems | None |
| P2 | |
| Decision variables | $x_1, x_2 \in \{-5, -4, \ldots, 4, 5\}$ |
| Objective | $\min \{c_1 x_1^2 + c_2 x_2^3\}$ |
| Constraint | $ax_1 + b\sqrt{x_2} = 0$ |
| Dual function | $J_{LR}^n(u) = \min_{x_1, x_2}\{c_1 x_1^2 + c_2 x_2^3 + u(ax_1 + b\sqrt{x_2})\}$, or $J_{LR}^s(u) = L_1(u) + L_2(u)$ |
| Subproblems | $L_1(u) = \min_{x_1}\{c_1 x_1^2 + aux_1\}$ $L_2(u) = \min_{x_2}\{c_2 x_2^3 + bu\sqrt{x_2}\}$ |

The separable integer programming problem (IP) is formulated as $$IP: \min_{x^l \leq x \leq x^u} J_{IP} \equiv \sum_{i=1}^{I} J_i(X_i), \quad (1)$$

subject to $$\sum_{i=1}^{I} H_{ij}(x_i) = 0, j = 1, \ldots, m, \quad (2)$$

$$h_{ik}(x_i) = 0, i = 1, \ldots, I; k = 1, \ldots, K_i, \quad (3)$$

and $$x_i \in Z^{n_i},$$

where $J_i(x_i)$, $H_{ij}(x_i)$, and $h_{ik}(x_i)$ are real-valued functions that map $Z^{n_i} \to R$, $$x = \begin{bmatrix} x_1 \\ x_2 \\ \cdot \\ \cdot \\ \cdot \\ x_I \end{bmatrix}$$

is the n×1 vector of decision variables with $n = \sum_{i=1}^{I} n_i$ and lower and upper bounds $x^l$ and $x^u$, respectively, and Z is the set of integers. The constraints in EQUATION 2 are system-wide constraints because they couple the subsystem variables $\{x_i\}$, and the constraints in EQUATION 3 pertain to the individual subsystems. The integer linear program is a special case of IP when $J_i(x_i)$, $H_{ij}(x_i)$, and $h_{ik}(x_i)$ are linear functions of $x_i$.

The dual function is formed by applying the Lagrangian relaxation technique to relax the m constraints in EQUATION 2. In general, these constraints couple the decision variables $\{x_i\}_{i=1}^{I}$ thus making IP difficult to solve. The Lagrangian relaxation of IP (expressed as LR(u)) is given by:

$$LR(u): J_{LR}(u) \equiv \min_{x^l \leq x \leq x^u, x \in Z^n} \left[ \sum_{i=1}^{I} J_i(x_i) + \sum_{j=1}^{m} u_j \sum_{i=1}^{I} H_{ij}(x_i) \right], \quad (4)$$

subject to the constraints of EQUATION 3.

The function $J_{LR}(u)$ is the Lagrangian dual function and u is an m×1 vector of Lagrange multipliers. The minimization in EQUATION 4 is easier to solve than IP because the decision variables are decoupled by the Lagrange multipliers. This decoupling allows the minimization in EQUATION 4 to be solved for each decision variable $x_i$ independently of other decision variables. The resulting subproblems are:

$$L_i(u) \equiv \min_{x_i^l \leq x_i \leq x_i^u, x_i \in Z^{n_i}} \left[ J_i(x_i) + \sum_{j=1}^{m} u_j H_{ij}(x_i) \right]$$

subject to $h_{ik}(x_i) = 0, k = 1, \ldots, K_i,$ for a given u. The dual function in EQUATION 4 is now written in terms of the subproblems:

$$J_{LR}(u) = \sum_{i=1}^{I} L_i(u)$$

To evaluate the dual function at a fixed u, the subproblems $L_i(u)$ are solved. To evaluate a subgradient at u, a solution to the subproblems is substituted into the constraints in EQUATION 2 to form a subgradient vector:

$$g(u) = \left[ \sum_{i=1}^{I} H_{i1}(x_i), \sum_{i=1}^{I} H_{i2}(x_i), \ldots, \sum_{i=1}^{I} H_{im}(x_i) \right]^T.$$

The Lagrangian dual problem (expresses as (LD)) is then given by:

$$LD: J_{LD} \equiv \max_{u} J_{LR}(u)$$

The facet ascending algorithm of the present invention solves LD.

Figure 5:
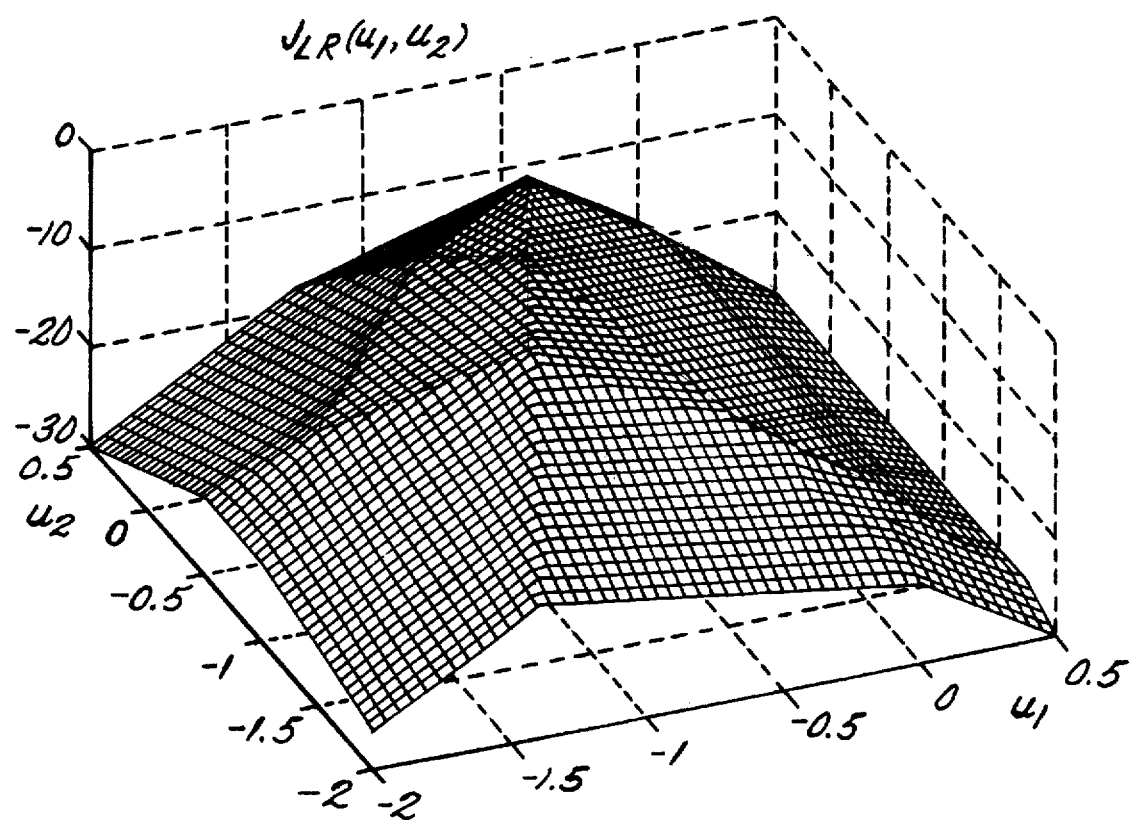
FIG. 5 is a three dimensional plot of a dual function.

The term:

$$\left[ \sum_{i=1}^{I} J_i(x_i) + \sum_{j=1}^{m} u_j \sum_{i=1}^{I} H_{ij}(x_i) \right]$$

from EQUATION 4 is of the form $$(g^x)^T u + c^x,$$

where $g^x = [\sum_{i=1}^{I} {}'H_{i1}(x_1) \ldots \sum_{i=1}^{I} {}'H_{im}(x_i)]^T$ and $c^x = \sum_{i=1}^{I} {}'J_i(x_i)$. For a fixed x, the term $(g^x)^T u + c^x$ a hyperplane in the space spanned by u. Therefore, since x takes on discrete values only, the dual function of the form:

$$J_{LR}(u) = \min_{x^l \leq x \leq x^u, x \in Z^n, x \text{ subject to the constraints of Equation 3}} (g^x)^T u + c^x$$

is polyhedral concave. An example of a separable integer programming problem is shown in Table II below and the corresponding dual function is shown in FIG. 5.

TABLE II

| Example of an integer programming problem | |
|---|---|
| Decision variable | $x_1, x_2, \ldots, x_5 \in \{-2, -1, 0, 1, 2\}$ |
| Objective | $\min\{x_1 - 3x_2 + 2x_3 + 3x_5\}$ |
| Constraints | $x_1 - x_2 + 2x_3 + x_4 + 5x_5 = 2$ |
| | $-x_1 - 2x_2 + x_3 - 2x_5 = 2$ |
| Dual function | $J_{LR}(u) = \min_x\{x_1 - 3x_2 + 2x_3 + 3x_5 + u_1(x_1 - x_2 + 2x_3 + x_4 + 5x_5 - 2) + u_2(-x_1 - 2x_2 + x_3 - 2x_5 - 2)\}$, or |
| | $J_{LR}(u) = \sum_{i=1}^{5} L_i(u) - 2u_1 - 2u_2$ |
| Subproblems | $L_1(u) = \min_{x_1} \{(1 + u_1 - u_2)x_1\}$ |
| | $L_2(u) = \min_{x_2} \{(-3 - u_1 - 2u_2)x_2\}$ |
| | $L_3(u) = \min_{x_3} \{(2 + 2u_1 + u_2)x_3\}$ |
| | $L_4(u) = \min_{x_4} \{u_1 x_4\}$ |
| | $L_5(u) = \min_{x_5} \{(3 + 5u_1 - 2u_2)x_5\}$ |

The important features of a dual function $J_{LR}(u)$ are that the function consists of multiple facets, is nondifferentiable, and is concave. For convenience later, $J_{LR}(u)$ is also written as:

$$J_{LR}(u) \equiv \min_{p = 1, 2, \ldots, P} f_p(u), \quad (5)$$

where P is the cardinality of the set $F = \{x : x^l \leq x \leq x^u; h_{ik}(x_i) = 0, \ldots, I, k = 1, \ldots, k_i; x \in Z^n\}$, and the facets $f_p(u) = g^T_p(u) = c_p, p = 1, 2, \ldots, P$, are such that each x in F has an associated index p.

The facet ascending algorithm exploits the polyhedral concave nature of the dual function by ascending the intersection of multiple facets, thus avoiding zigzagging across the intersection as in the prior art. First, given an initial point and direction, a line search is performed which updates the multipliers and places them on another intersection of multiple facets. The multipliers at each iteration must land exactly on an intersection of facets so that the facets can be ascended along the intersection. Finding an exact optimal line search value in a finite number of steps so that the multipliers will land exactly on an intersection of facets is difficult. Then, the facets that intersect at the newly updated point are found. The number of possible facets grows exponentially with problem size. This limitation is overcome by identifying intersecting facets through evaluation the dual function values at points in the neighborhood of the current point. After a sufficient number of intersecting facets are found, a direction of ascent along the intersection of facets is computed by projecting the gradient of one of the facets onto the intersection. When the projection is zero before the maximal is reached, which occurs when the newly updated multipliers correspond to a maximum point within the intersection of the facets, a non-ascendable facet is identified. Then a direction of ascent is computed by re-projecting a gradient onto the intersection of all the facets except the nonascendable one. Repeating the initial step, the facets are ascended by performing a line search along the direction of ascent. The above steps are repeated until a stopping criteria is met.

The line search seeks to find an optimal value of $J_{LR}(u)$ along a direction of ascent $d^k$ from a point $u^k$, where k denotes the $k^{th}$ iteration of the algorithm, and is equivalent to the problem of finding the maximum of a scaler polyhedral concave function. This novel line search method finds the maximum in a finite number of iterations by recognizing that there exists an optimal value at the intersection of two line segments of the function. To simplify the notation, the scaler function to be maximized is denoted by:

$$\phi(\alpha) \equiv J_{LR}(u^k + \alpha d^k),$$

which is polyhedral concave. This line search method finds an $\alpha^* > 0$ which maximizes $\phi(\alpha)$. Then the Lagrange multipliers are updated according to:

$$u^{k+1} = u^k + \alpha^* d^k \quad (6)$$

The line search method assumes that $$\phi'(0) \in \partial \phi(0) > 0, \forall \phi'(0) \in \partial \phi(0), \quad (7)$$

where $\partial \phi(\alpha)$ is the generalized gradient and $\phi'(\alpha)$ is a subgradient of $\phi(\alpha)$. The assumption in EQUATION 7 implies $d^k$ must be a direction of ascent.

The first step in this line search method is to find an interval in which the maximum exists. The interval is defined as $[\alpha_1, \alpha_2]$, where $0 \leq \alpha_1 < \alpha_2 < \infty$. Because of the concavity of $\phi(\alpha)$, an optimal value $\alpha^*$ is bounded by the interval of $\phi'(\alpha_1) > 0$ and $\phi'(\alpha_2) \leq 0$, where $$\phi'(\alpha) = g^T(u^k = \alpha d^k)d^k,$$

and g(u) is a subgradient of $J_{LR}(u)$. The value of $\alpha_1$ can be initialized to zero because of the assumption in EQUATION 7. The right end of the interval, $\alpha_2$, is found by iteratively increasing its value until $\phi'(\alpha_2) \leq 0$.

Figure 6:
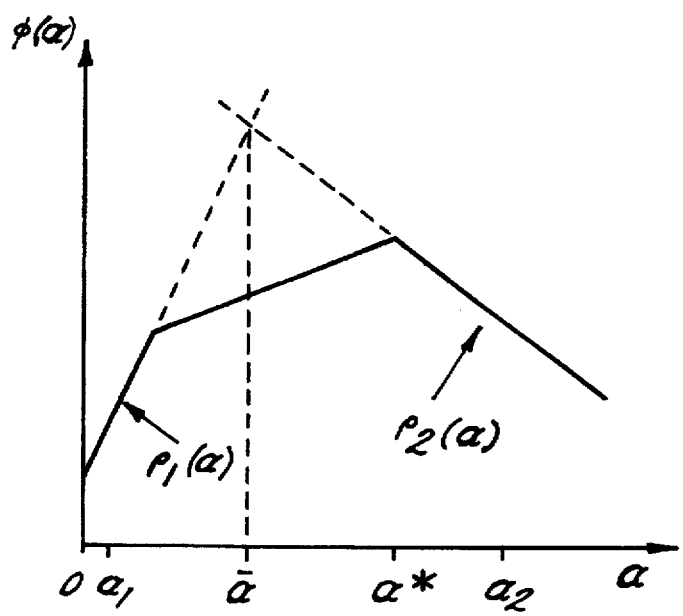
FIG. 6 is a plot of the intersection of two lines defined by intersecting facets.

The second step in this line search is to find $\alpha^*$. The new line search takes advantage of the fact that an optimum occurs at the intersection of two adjacent line segments of $\phi(\alpha)$. Given the interval $[\alpha_1, \alpha_2]$ from the first step, the following information is known or can be computed: $\phi(\alpha_1)$, $\phi'(\alpha_1)$, $\phi(\alpha_2)$, and $\phi'(\alpha_2)$. From this information, the lines of $\phi(\alpha)$ corresponding to the points $\alpha_1$ and $\alpha_2$ are $$p_1(\alpha) = \phi'(\alpha_1)(\alpha - \alpha_1) + \phi(\alpha_1),$$

and $$p_2(\alpha) = \phi'(\alpha_2)(\alpha - \alpha_2) + \phi(\alpha_2),$$

as shown in FIG. 6. The intersection of these two lines $\bar{\alpha}$, is easily computed by solving for $\alpha$ in $p_1(\alpha) = p_2(\alpha)$:

$$\bar{\alpha} = \frac{\phi(\alpha_1) - \phi'(\alpha_1)\alpha_1 - [\phi(\alpha_2) - \phi'(\alpha_2)\alpha_2]}{\phi'(\alpha_2) - \phi'(\alpha_1)} \quad (8)$$

The point $\bar{\alpha}$ in EQUATION 8 is always in the interval $[\alpha_1, \alpha_2]$, but may or may not be optimal. The point $\bar{\alpha}$ is optimal if $p_1(\bar{\alpha}) = \phi'(\bar{\alpha})$. If $\bar{\alpha}$ is not optimal, then the interval is narrowed by assigning $\alpha_1$ to $\bar{\alpha}$ if $\phi'(\bar{\alpha}) > 0$ or by assigning $\alpha_2$ to $\bar{\alpha}$ if $\phi'(\bar{\alpha}) \leq 0$; then the second step is repeated. It is noted here that the $\alpha^*$ found by this line search corresponds to a nondifferentiable point of $\phi(\alpha)$, and this implies that $u^k + \alpha^* d^k$ is a nondifferentiable point of $J_{LR}(u)$ at which multiple facets of $J_{LR}(u)$ intersect.

The vector of Lagrange multipliers $u^{k+1}$ (which is generated according to EQUATION 6) at each iteration is a nondifferentiable point of $J_{LR}(u)$ and lies on multiple facets, and the facet ascending algorithm attempts to move along an intersection of these facets. The set A(u) is defined as the set of supporting facets which are active at u:

$$A = \{p : f_p(u) = J_{LR}(u)\}.$$

For $A(u^{k+1})$ containing more than one element (which is always the case since $u^{k+1}$ is a nondifferentiable point), the intersection of all facets in $A(u^{k+1})$ is the subspace $N(u^{k+1})$ given by:

$$N(u^{k+1}) = \{u : f_i(u) = f_j(u), \forall i, j \in A(u^{k+1})\}.$$

Figure 7A:
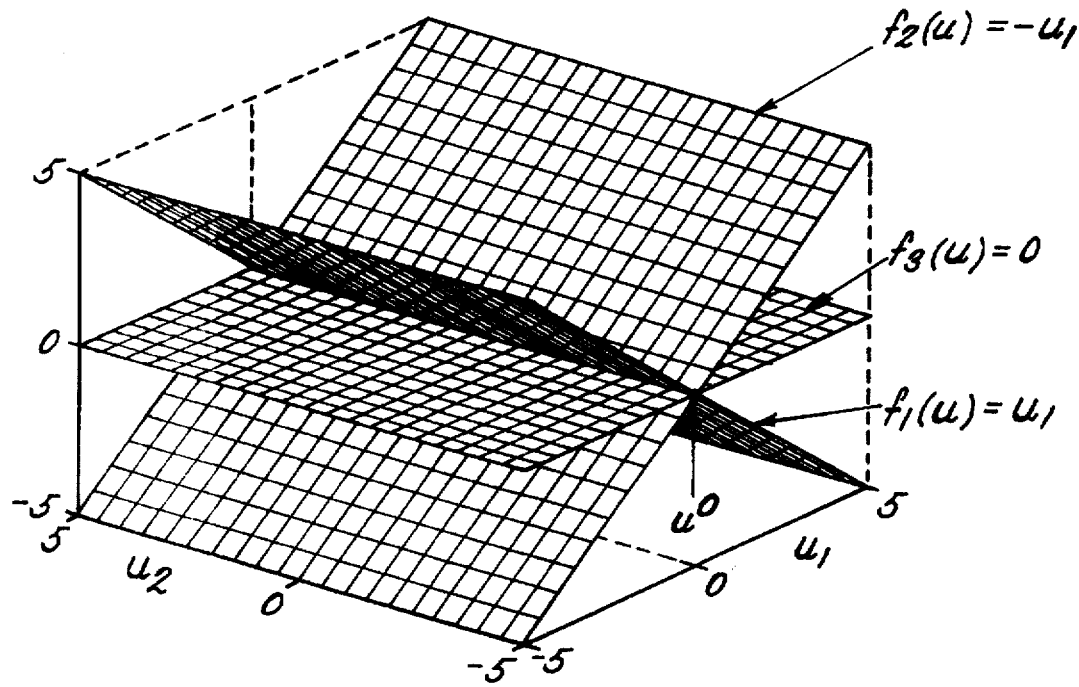
FIGS. 7A and B are three dimensional plots of intersecting facets.
Figure 7B:
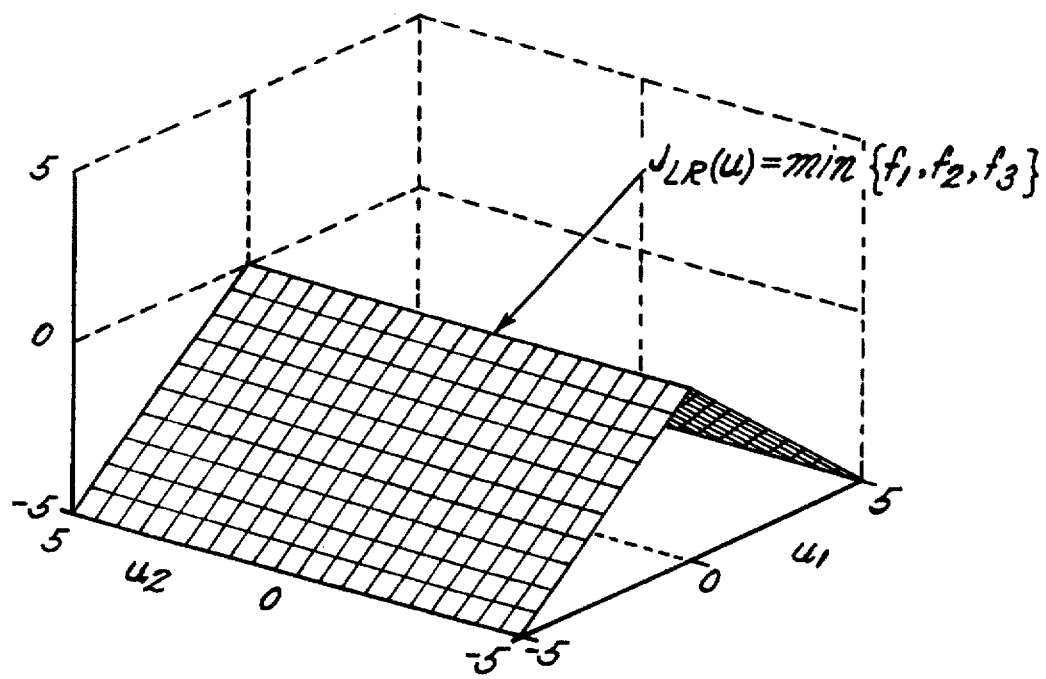

It may not be necessary that all the facets in A be known in order to determine N. For example, if $A(u^{k+1}) = \{1,2,3\}$, $f_1(u) = u_1$, $f_2(u) = u_1$, $f_3(u) = 0$, and $J_{LR}(u) = \min\{f_1(u), f_2(u), f_3(u)\}$, see FIGS. 7A and B, then any one of these three facets can be dropped from $A(u^{k+1})$ without changing $N(u^{k+1})$. This minimum set of supporting facets needed to define $N(u^{k+1})$ is denoted by D. The subspace N can then be represented in matrix form as Su=0, where the matrix S has rows $g_q^T - g_i^T$, for any $q \in D$ and for all $i \in D-q$. The matrix S is a full rank since D contains only those facets that determine N(if S were not full rank, then a facet of D could be removed without changing the subspace Su=0). If D contains t elements ($t \leq m+1$, where m is the number of system-wide constraints in EQUATION 2), then S has dimension $(t-1) \times m$ for $t \geq 2$.

As will be shown hereinafter, the facets in D are found one at a time until a direction of ascent is obtained. The set of facets currently found is represented by $\hat{D}$ and the respective subspace matrix is $\hat{S}$. If $\hat{D}$ contains at least two elements, the algorithm must find a direction of ascent within the subspace $\hat{S}u=0$ (if one exists) and avoid zigzagging. In FIG. 4, the intersection of facets is an edge and there are two possible directions along this edge, left or right. The direction of ascent, right, is obtained by projecting the gradient of one of the facets onto the edge. In the general case where a set of facets $\hat{D}$ is found, a potential direction of ascent is computed by projecting a gradient $g_q$ of a facet, for any $q \in \hat{D}$, onto $\hat{S}u=0$. The projection is:

$$d = [I - \hat{S}^T(\hat{S}\hat{S}^T)^{-1}\hat{S}]g_q \quad (9)$$

where $(\hat{S}\hat{S}^T)^{-1}$ always exists since $\hat{S}$ is full rank. The direction d in EQUATION 9 is a direction of ascent if one of the facets in $\hat{D}$ is active at $u^{k+1} + \epsilon d$ for some $\epsilon > 0$.

Figure 8A:
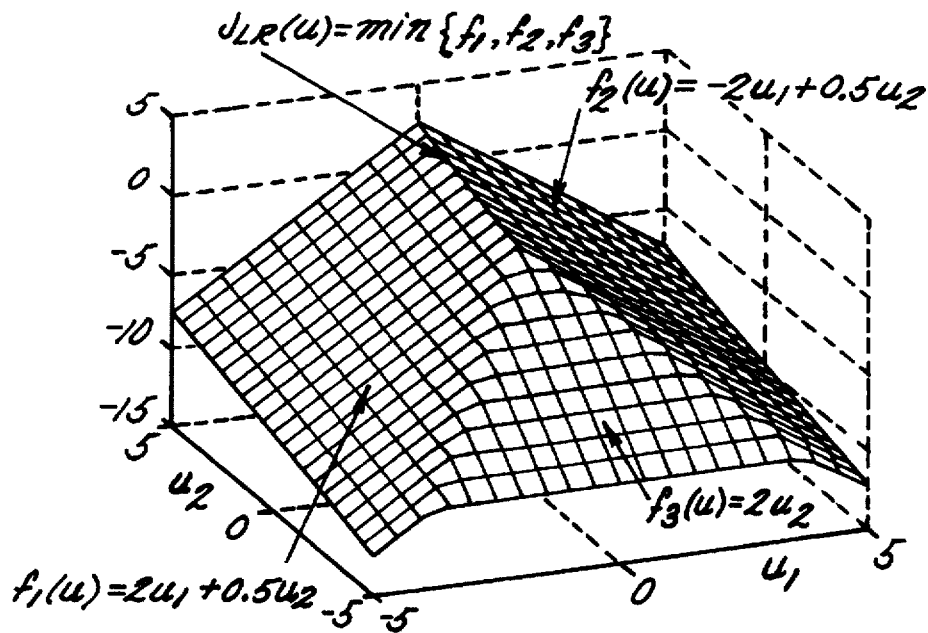
FIG. 8A is a three dimensional plot of a dual function having three facets.
Figure 8B:
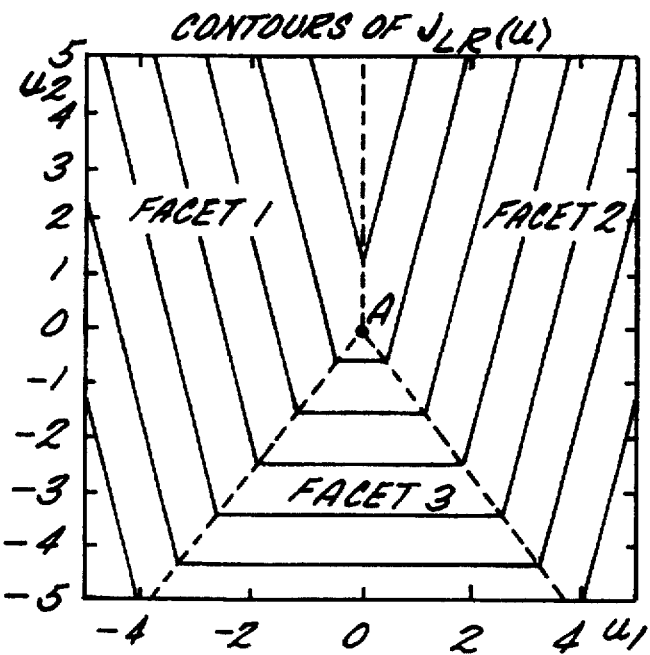
FIG. 8B is a two dimensional plot of the dual function of FIG. 8A.

If the value old in EQUATION 9 is zero and $u^{k+1}$ is not an optimal point, then $u^{k+1}$ is a quasi-stationary point. The quasi-stationary condition for a concave function implies that $u^{k+1}$ is a maximum on the surface $\hat{S}u=0$ and, therefore, a direction of ascent does not exist on this surface (or on the surface Su=0 which is a subspace of $\hat{S}u=0$). An example is when all the facets in $\hat{D}$ intersect to form a vertex, such as when $\hat{D} = \{1,2,3\}$ in FIGS. 8A and B at point A (in this case D also equals $\{1,2,3\}$). In FIGS. 8A and B, only two of the facets in $\hat{D} = \{1,2,3\}$ can be ascended from A, in this case Facets 1 and 2. For a three dimensional figure, it is easy to see graphically which facet to drop at a vertex. The major difficulty is to determine which facet to drop from $\hat{D}$ for the general case. In accordance with a first theorem the projection in EQUATION 9 yields a direction of ascent if $d \neq 0$ and if one of the facets in $\hat{D}$ is active along d, and specifies how to handle the case when d=0.

In accordance with this first theorem, suppose that $u^{k+1}$ is not an optimal point. If the projection of $g_q$ onto $\hat{S}u=0$ for some $q \in \hat{D}(u^{k+1})$ (given by EQUATION 9) is not equal to zero and if one of the facets in $\hat{D}$ is active at $u^{k+1} + \epsilon d$ for some $\epsilon > 0$, then the projection d is a direction of ascent. If d=0, a new potential direction of ascent $\bar{d}$ can be found by following these steps:

(1) solving $\hat{S}^T \mu = g_q$,
(2) letting $\lambda_i = \mu_i$ for $i \in \hat{D}-q$, $\lambda_q = 1 - \Sigma_i \in \hat{D}-q \lambda_i$, and
(3) for $w \in \hat{D}$ such that $\lambda_w < 0$, drop w from $\hat{D}$. If there is only one facet left in $\hat{D}$, let $\bar{d} = g_q$, $q \in \hat{D}-w$. Otherwise, re-project according to:

$$\bar{d} = [I - \bar{S}^T(\bar{S}\bar{S}^T)^{-1}\bar{S}]g_q,$$

where $q \in \hat{D}-w$ and $\bar{S}$ has rows $g_q^T - g_i^T$, $i \in \hat{D}-w-q$.

The multiplier $\lambda_i$ can be regarded as the derivative of $J_{LR}(u)$ with respect to the facet $f_i(u)$. Therefore, removing a non-ascendable facet w from $\hat{D}$ with $\lambda_w < 0$ and re-projecting a gradient as in the third step above will result in $\bar{d} \neq 0$. The direction $\bar{d}$ is a direction of ascent if one of the facets in $\hat{D}$ is active along $\bar{d}$ (if not, a new facet is found). In the example of FIGS. 8A and B, the value of $\lambda$ is $\lambda_1 = \frac{2}{3}$, $\lambda_2 = \frac{2}{3}$, $\lambda_3 = -\frac{1}{3}$; therefore, since $\lambda_3 < 0$, Facet 3 should be dropped from $\hat{D}$ in the third step. An important concept from the above theorem is the directional derivative, which is the slope of $J_{LR}(u)$ in the direction d. The directional derivative at $u^{k+1}$ in the direction d is $$J_{LR}(u^{k+1}, d) = g_i^T d = d^T d,$$

for $i \in \hat{D}$.

Above it was assumed that the facets in $\hat{D}$ are known. However, the facets at $u^{k+1}$ must be found. One approach is to compute $f_p(u^{k+1})$, $p=1,2,\ldots,P$, and check if $f_p(u^{k+1}) = J_{LR}(u^{k+1})$. Then the set $A(U^{k+1})$ contains all values of p where $f_p(u^{k+1}) = J_{LR}(u^{k+1})$. This approach is computationally expensive since the number of possible facets P grows exponentially with problem size. For example, if $x^l_i = 1$ and $x^u_i = M$ for $i=1,2,\ldots,n$, and there are no subsystem constraints as in EQUATION 3, the $P = M^n$ which is the cardinality off $F = \{x : x^l \leq x \leq x^u, x \in Z^n\}$. A preferred approach is to iteratively build up facets in $\hat{D}$ until a direction of ascent is obtained instead of trying to find A since the number of facets in $\hat{D}$ is limited to m+1.

To find two initial facets in $\hat{D}$, the result of the line search along $d^k$ is used. These two facets correspond to the point $u^k+\alpha_1 d^k$ and $u^k+\alpha_2 d^k$, where $\alpha_1$ and $\alpha_2$ are from the final line search interval at iteration k. The supporting facets are easily computed according to:

$$f_1(u) = g^T(u^k+\alpha_1 d^k)u + c_1 \quad (10)$$

and $$f_2(u) = g^T(u^k+\alpha_2 d^k)u + c_2 \quad (11)$$

where $$c_1 = J_{LR}(u^k+\alpha_1 d^k) - g^T(u^k+\alpha_1 d^k)(u^k+\alpha_1 d^k),$$

$$c_2 = J_{LR}(u^k+\alpha_2 d^k) - g^T(u^k+\alpha_2 d^k)(u^k+\alpha_2 d^k).$$

The intersection of these two facets is found by:

$$f_1(u) = f_2(u)$$

or $$[g^T(u^k+\alpha_1 d^k) - g^T(u^k+\alpha_2 d^k)]u = c_2 - c_1. \quad (12)$$

For m=2, the above equation describes a line, such as in FIG. 4. In general, EQUATION 12 describes a hyperplane (or subspace) in $R^m$.

After the two initial facets are found, other facets in $\hat{D}$ are obtained one at a time until a direction of ascent is found. The set $\hat{D}$ is initialized to $\hat{D}=\{1,2\}$, where Facets 1 and 2 are obtained from EQUATIONS 10 and 11. Then, the above theorem is applied to compute a direction d. Next, the algorithm takes a small step $\epsilon > 0$ (typically $\epsilon \approx 10^{-6}$) in the direction d from the point $u^{k+1}$, and computes the dual function $J_{LR}(u^{k+1}+\epsilon d)$ and the corresponding subgradient $g(u^{k+1}+\epsilon d)$. The purpose of this step is to determine if d is a direction of ascent along the facets currently in $\hat{D}$, otherwise, a new supporting facet is found. The equation of the facet at $u^{k+1}+\epsilon d$ is:

$$f_v(u) = g_v^T u + c_v, \quad (13)$$

where the gradient facet v is $$g_v = g(u^{k+1}\epsilon d)$$

and $$c_v = J_{LR}(u^{k+1}+\epsilon d) - g_v^T(u^{k+1}+\epsilon d).$$

By computing $J_{LR}(u^{k+1}+\epsilon d)$, facet v is known to be active at $u^{k+1}+\epsilon d$ since $J_{LR}(u)$ is defined to be the value of the minimum facet at u in EQUATION 5. But for this facet to also belong in $\hat{D}(u^{k+1})$, $\epsilon$ must be small enough to satisfy the condition $J_{LR}(u^{k+1})+\epsilon g_v^T d = f_v(u^{k+1}+\epsilon d)$, which states that facet u must be adjacent to the facets already in $\hat{D}$. If $\epsilon$ does not meet the above condition, it should be decreased until the condition is met.

If facet v has been previously found and is already in $\hat{D}(u^{k+1})$, then it is active at $u^{k+1}$ (by definition D), active at $u^{k+1}+\epsilon d$, (see EQUATION 13), and consequently active at all points between $u^{k+1}$ and $u^{k+1}+\epsilon d$ along d. Therefore, movement along d moves along facet v and the directional derivative at $u^{k+1}$ along d is $g_v^T d$, which also equals $d^T d$. Since $d^T d > 0$, d is a direction of ascent and lies in the intersection of the facets presently in $\hat{D}$. Conversely, if u has not been previously found and is not currently in $\hat{D}(u^{k+1})$, then $g_v^T d$ will not equal $d^T d$.

The test for whether v has been previously found is to compare $g_v^T d$ to $d^T d$. If $g_v^T d = d^T d$, then v has been previously found; otherwise, v has not previously been found and shall be added to $\hat{D}$, providing $\epsilon$ is small enough for v to be a supposing facet at $u^{k+1}$. A second theorem is provided stating the condition where v can be added to $\hat{D}$. In accordance with this second theorem, suppose that at least two facets of $\hat{D}(u^{k+1})$ have been found. Let d be computed as in first theorem described above. If a new supposing facet v along d is found or equivalently if $g_v^T d \neq d^T d$, then the matrix $\bar{S}$, formed by adding the row vector $g_q^T - g_v^T$ to $\hat{S}$, is full rank. Therefore, v can be added to $\hat{D}$.

When a new facet has been found, the subspace $\hat{S}$ is updated as in the second theorem and a new direction d is computed as in the first theorem using the updated $\hat{D}$. This process repeats until a direction of ascent is found (this occurs when $g_v^T d = d^T d$ as described above) and then the assignment $d^{k+1} = d$ is made.

The convergence of the facet ascending algorithm is demonstrated in a third theorem. In accordance with this third theorem, the facet ascending algorithm converges from any starting point $u^0$. The basis of this theorem is that $J_{LR}(u^{k+1}) > J_{LR}(u^k)$ when $u^k$ is a non-optimal point. The first and second theorems state that a direction of ascent can be found at each iteration k for a non-optimal point $u^k$. Once a direction of ascent $d^k$ is found, the line search produces $u^{k+1} = u^k + \alpha^* d^k$ where $J_{LR}(u^{k+1}) > J_{LR}(u^k)$.

The stopping criteria used depends on the application. For example, when $\lambda \geq 0$ in the first theorem, an optimal dual point is detected. However, some time-critical applications may require the algorithm to stop before an optimal dual solution is found. For example, the algorithm can be programmed to stop when the duality gap, the difference between the current primal feasible cost (obtained from a heuristic or a feasible solution to the subproblems) and the current dual cost, is less than some value. The algorithm can also be stopped after a fixed number of iterations.

The solution to the subproblems is rarely a feasible solution to the primal problem. Therefore, a heuristic is usually needed to obtain a feasible primal solution. The heuristic is typically problem dependent and incorporates simple rules for converting the infeasible subproblem to a feasible primal solution. Examples of heuristics for scheduling problems can be found in articles entitled "A Practical Approach to Job-Shop Scheduling Problems" by D. J. Hoitomt, P. B. Luh, and K. R. Pattipati, IEEE Trans. on Robotics and Automation 9, 1–13, 1993 and "A Dual Ascent and Column Generation Heuristic for the Discrete Lotsizing and Scheduling Problem with Setup Times", by D. Cattrysse, M. Salomon, R. Kuik and L. Wassenhove, Mgmt. Sci. 39, 477–486, 1993, both of which are incorporated herein by reference.

The steps of the facet ascending algorithm of the present invention are outlined below.

(1) Initialize parameters as follows,
 (a) set k=0,
 (b) initialize $u^0$,
 (c) compute the subgradient $g(u^0)$, and
 (d) set $d^0 = g(u^0)$;

(2) Perform a line search along $d^k$ to obtain $\alpha$, $\alpha_2$, and $\alpha^*$;

(3) Update $u:u^{k+1} = u^k + \alpha^* d^k$, in accordance with EQUATION 6;

(4) Stop when the stopping criteria is met, which may involve using heuristics to obtain a feasible primal solution;

(5) From the points $u_a = u^k + \alpha_1 d^k$ and $u_b = u^k + \alpha_2 d^k$, where $\alpha_1$ and $\alpha_2$ result from the line search at the current iteration, initialize the matrix $\hat{S} = [g_a^T - g_b^T]$, where $g_a = g(u_a)$ and $g_b = g(u_b)$;

(6) Evaluate $d=[I-\hat{S}^T(\hat{S}\hat{S}^T)^{-1}\hat{S}]g_a$, if d=0,
  (a) solve $\hat{S}^T \mu=g_a$,
  (b) let $\lambda_i=\mu_i$ for i∈ $\hat{D}-\alpha, \lambda_\alpha=1-\Sigma_{i\in \hat{D}-\alpha}\lambda_i$.
  (c) for w ∈ $\hat{D}$ such that $\lambda_w<0$, if w≠α, remove the row $g_\alpha^T-g_w^T$ from $\hat{S}$ and form $d=[I-\hat{S}^T(\hat{S}\hat{S}^T)^{-1}\hat{S}]g_a$, if w=α, subtract the first row of $\hat{S}$ from all other rows and subsequently remove the first row, then form $d=[I-\hat{S}^T(\hat{S}\hat{S}^T)^{-1}\hat{S}]g_b$;
(7) From $u^{k+1}$, take a small step ∈ in the direction d and compute $J_{LR}(u^{k+1}+\epsilon d)$ and the subgradient $g_v=g(u^{k+1}+\epsilon d)$. If $g_v^T d=d^T d$, set $d^{k+1}=d$, increment k by 1, and go to Step 2 above; and
(8) Add the row $(g_a-g_v)^T$ to $\hat{S}$ and go to Step 6 above.

The algorithm requires storage of four sets of multipliers corresponding to $u^k$, $u^{k+\alpha}_1 d^k$, $u^k+\alpha_2 d^k$, and $u^k+\alpha^* d^k$, the respective subgradients, and $\hat{S}$. However, storage of all the facet gradients in $\hat{D}$ is not required since this information is contained in $\hat{S}$. It will be appreciated that the facet ascending algorithm is stored in computer memory and is executed by the computer processor, as is well known.

The following nonlinear integer programming example demonstrates how the facet ascending algorithm can solve a manufacturing scheduling problem where parts requiring multiple operations need to be processed on multiple machine types. This formulation is motivated by the article entitled "A Practical Approach to Job-Shop Scheduling Problems" by D. J. Hoitomt, P. B. Luh, and K. R. Pattipati, IEEE Trans. on Robotics and Automation 9, 1–13, 1993, but here, for simplicity, a given operation can be performed on exactly one machine type and there is no required slack time between sequential operations. The variables for this formulation are as follows, where operation j of part i is referred to as operation (i, j):

$\delta_{ijkh}$ integer variable equal to one if operation (i, j) is active on machine type h at time k, and 0 otherwise $b_{ij}$ beginning time of operation (i, j)

$c_{ij}$ completion time of operation (i, j)

$C_i$ completion time of part i $D_i$ due date of part i

H number of machine types

J objective function to be optimized

K time horizon under consideration $M_{kh}$ number of machines of type h available at time k, k=1,2, . . . , K $m_{ij}$ machine type used to process operation (i, j)

N number of parts to schedule $N_i$ number of operations for part i $t_{ij}$ time required from the resource to perform operation (i, j)

$T_i$ tardiness of part i equals max[0, $C_i-D_i$]

$W_i$ weight (or importance) of part i.

The decision variables in this formulation are the beginning times of the operations, $\{b_{ij}\}$. It is assumed that operation processing is nonpreemptive, the parts are immediately available for processing, the operations of a part are constrained to be sequential, and the time horizon is long enough to complete all the operations.

This manufacturing scheduling problem (designated (MS)) is formulated as follows:

$$MS: \min_{1 \leq \{h_{ij}\} \leq K, b_{ij} \in Z} J \equiv \sum_{i=1}^{N} w_i T_i^2$$

subject to capacity constraints, $$\sum_{i=1}^{N}\sum_{j=1}^{N_i} \delta_{ijkh} \leq M_{kh}, k=1, 2, \ldots, K; h=1, 2, \ldots, H,$$

operation precedence constraints, $$c_{ij}+1 \leq b_{i,j+1}, i=1,2,\ldots,N; j=1,2,\ldots,N_i-1; l=j+1$$

and processing time requirements, $$c_{ij}-b_{ij}+1=t_{ij}, i=1,2,\ldots,N; j=1,2,\ldots,N_i.$$

To put MS in the form of IP, slack variables are added to the inequality constraints. By doing so, the Lagrange multipliers are not constrained to be non-negative as they are for inequality constraints. Also, a scaling factor on the capacity constraints is included to allow the dual function to be shaped for possible improvement in convergence. The modified scheduling problem is $$MS: \min_{\{b_{ij}\},\{S^c_{kh}\},\{S^p_{ij}\}} J \equiv \sum_{i=1}^{N} w_i T_i^2 \qquad (14)$$

subject to capacity constraints, $$\gamma_h\left(\sum_{i=1}^{N}\sum_{j=1}^{N_i} \delta_{ijkh} + S^c_{kh}\right) - \gamma_h M_{kh}, k=1, 2, \ldots, K; H=1, 2, \ldots, H,$$

operation precedence constraints, $$c_{ij}+1+S_{ij}^p=b_{i,l}, i=1,2,\ldots,N; J=1,2,\ldots N_i-1; l=j+1, \qquad (16)$$

and processing time requirements, $$c_{ij}-b_{ij}+1=t_{ij}, i=1,2,\ldots,N, j=1,2,\ldots,N_i \qquad (17)$$

The slack decision variables for capacity, $\{S_{kh}^c\}$, represent the unused machines of type h at time k and $\{S_{ij}^p\}$ represent the idle time between operations j and j+1 of part i. The constraint scale factor $\gamma_h$ shapes the dual function by changing the subgradient, which is the vector of scaled constraints evaluated at a solution to the subproblems. The equivalence of MS and IP is seen by comparing EQUATIONS 14 to 1, 15 and 16 to 2, and 17 to 3.

The Lagrangian dual function is formed by relaxing the constraints in EQUATIONS 15 and 16 with Lagrange multipliers $\{\pi_{kh}\}$ and $\{\eta_{ij}\}$, respectively:

$$J_{LR}(\pi,\eta) = \min_{\{b_{ij}\}\{S^c_{kh}\},\{S^p_{ij}\}} \left\{ \sum_{i=1}^{N} w_i T_i^2 + \sum_{k=1}^{K}\sum_{h=1}^{H} \pi_{kh}\left[\gamma_h\left(\sum_{i=1}^{N}\sum_{j=1}^{N_i}\delta_{ijkh}+S^c_{kh}-M_{kh}\right)\right] + \sum_{i=1}^{N}\sum_{j=1}^{N_i-1} \eta_{ij}(c_{ij}+1+S^p_{ij}-b_{ij}) \right\} \qquad (18)$$

subject to EQUATION 17.

Now the minimization in EQUATION 18 can be decomposed into operation level subproblems:

$$L_{ij} = \min_{1 \leq b_{ij} \leq K, b_{ij} \in Z} \left\{ w_i T_i^2 \Delta_{ijN_i} + \sum_{k=b_{ij}}^{c_{ij}} \overline{\pi}_{kmij} \gamma_{mij} + (\eta_{ij}\overline{\Delta}_{ijN_i} - \eta_{i,j-1}\overline{\Delta}_{ij1}) b_{ij} \right\} \quad (19)$$

where $\Delta_{ijN}{}^j$ is 1 if operation (i, j) is the last operation of job i and is 0 otherwise, $\overline{\Delta}_{ijN}{}^j = 1 - \Delta_{ijN}{}^j$, and $\overline{\Delta}_{ijN}{}^j$ is 0 if operation (i, j) is the first operation of job i and is 1 otherwise. The slack subproblems are:

$$L_{kh}^c = \min_{0 \leq S_{kh}^c \leq M_{kh}, S_{kh}^c \in Z} \{\gamma_h \pi_{kh} S_{kh}^c\}$$

$$L_{ij}^p = \min_{0 \leq S_{ij}^p \leq K, S_{ij}^p \in Z} \{\eta_{ij} S_{ij}^p\}$$

The dual function is now written in terms of subproblems:

$$J_{LR}(\pi,\eta) = -\sum_{k=1}^{K}\sum_{h=1}^{H} \gamma_h \pi_{kh} M_{kh} + \sum_{i=1}^{N}\sum_{j=1}^{N_i-1} \eta_{ij} t_{ij} + \quad (20)$$

$$\sum_{i=1}^{N}\sum_{j=1}^{N_i} L_{ij} + \sum_{k}^{K}\sum_{h=1}^{N_i} L_{kh}^c + \sum_{i=1}^{N}\sum_{j=1}^{N_i-1} L_{ij}^p.$$

The facet ascending algorithm and the prior art modified subgradient method are tested on several examples of the scheduling problem MS. In all cases, the multipliers are initialized to zero and the scaling factors $\gamma_h$ are set to one except for the last case, where $\gamma_h = 0.0002$ (found by trial and error). The modified subgradient algorithm implementation stops if 1000 iterations have been executed or the duality gap is zero. The facet ascending algorithm stops if the duality gap is zero or if the computer central processing unit (CPU) time expended reaches the total amount of CPU time used by the subgradient method for the same test case. The heuristic of the article entitled "A Practical Approach to Job-Shop Scheduling Problems" by D. J. Hoitomt, P. B. Luh, and K. R. Pattipati, IEEE Trans. on Robotics and Automation 9, 1–13, 1993, is used to compute feasible schedules. The results, presented in Table III below, show that the facet ascending algorithm is as good or better than the prior art modified subgradient method in all cases in terms of CPU time and the number of iterations, and is significantly better in terms of CPU time in most cases. The CPU time needed for both methods depends on the dimension of the dual function, the complexity of the subproblems, and the method itself.

In Table III, the notation "M/P/O/T" provides for the number of machines (M), the number of parts (P), the number of operations (O), and the time horizon (T). It will be noted that when the number of operations is larger than the number of parts, precedence-constrained operations are considered. Further, the CPU time is in (minutes: seconds) on a SUN Sparestation 2. "FAA" means facet ascending algorithm in accordance with the present invention, while "Subgrd." means modified subgradient method in accordance with the prior art.

The facet ascending algorithm of the present invention provides an excellent alternative to prior an subgradient-type methods within the Lagrangian relaxation framework for separable integer programming problems. The algorithm efficiently optimizes the dual function by ascending the intersection of supporting facets instead of zigzagging across the intersection. This algorithm can also be applied to general polyhedral concave (or convex) functions, not just the dual function of integer programs. In this case the number of facets may simply be replaced by the enumeration procedure. The facet ascending algorithm can therefore be applied to max-min problems where the minimization is over a set of linear functions.

In an alternate embodiment of the present invention, an improved version of the facet ascending algorithm for resolving an unconstrained maximum of a nonsmooth concave function:

$$\max_{x \in R^n} f(x), f: R^n \to R, \quad (21)$$

is presented. It is assumed that f(x) is Lipschitzian, and for a given value x, there exists a subroutine which returns f(x) and exactly one arbitrary subgradient at x. A subgradient g is a n-vector (column) in the subdifferential ∂f(x), $$\partial f(x) = \{g \in R^n : f(y) \leq f(x) + g^T(y-x), \forall y \in R^n\} \quad (22)$$

The Lipschitz property of f implies that all subgradients are finite, ∂f exists everywhere, and ∂f is a nonempty compact convex set in $R^n$.

Methods for solving EQUATION 21 fall into three classes: subgradient, cutting plane, and bundle methods. The prior art subgradient method sets the direction at each iteration to a subgradient of the current iterate, and moves

TABLE III

Effectiveness and efficiency under different optimization methods

| Primal Dimensions M/P/O/T | Dimension of dual function | Opt. Method | No. Iter. | Dual Cost | Primal Cost | Duality Gap | CPU Time |
|---|---|---|---|---|---|---|---|
| 1/12/12/50 | 51 | FAA | 83 | 25,500 | 25,500 | 0.0 | 0:17 |
|  |  | Subgrd. | 1000 | 17,100 | 25,500 | 49.1 | 0:43 |
| 2/6/6/30 | 61 | FAA | 15 | 9,660 | 9,660 | 0.0 | 0:01 |
|  |  | Subgrd. | 1000 | 9,440 | 9,660 | 2.3 | 0:12 |
| 12/1/12/70 | 82 | FAA | 26 | 103,100 | 106,000 | 2.8 | 0:08 |
|  |  | Subgrd. | 1000 | 3,000 | 106,000 | 2.9 | 0:08 |
| 1/6/6/40 | 41 | FAA | 126 | 10,023 | 10,023 | 0.0 | 0:09 |
|  |  | Subgrd. | 1000 | 9,980 | 10,023 | 0.4 | 0:23 |
| 3/4/12/30 | 99 | FAA | 79 | 5,210 | 5,340 | 2.5 | 0:16 |
|  |  | Subgrd. | 1000 | 5,200 | 5,340 | 2.7 | 0:16 | some distance along the direction to the next iterate. The slow convergence rate (less than linear) of subgradient methods causes these methods to require many iterations to reach an optimum. However, due to the simplicity and speed in computing a direction and the global convergence of the subgradient method, it has heretofore been the predominate method of solving such problems. The prior art cutting plane method uses a function value and co subgradient at each iteration to build up a polyhedral concave approximating function f̂(x) to f(x). At each iteration, the current approximation f̂(x) is maximized (a stabilizing term may be added for better convergence), and the new direction vector emanates from the current iterate toward the maximizing point. The approximation f̂ is improved at each iteration. The prior art bundle method improved on the convergence rate over the subgradient and cutting plane methods. The bundle method approximates the ε-subdifferential at each iteration point using the convex hull P of ε-subgradients previously computed and stored in a so-called "bundle" B. For a given approximation P (which is polyhedron), the bundle method computes an approximate ε-ascent direction by finding a hyperplane separating the origin and P. If P contains the origin (whereby there is no separating hyperplane), then the algorithm has found an ε-optimal point. The large number of computations ($O(nb+b^3)$, where b is the number of elements in the bundle and the $b^3$ term usually dominates) required to compute a direction limits the practicality of bundle methods to small problems, despite the method's good convergence property.

Figure 9A:
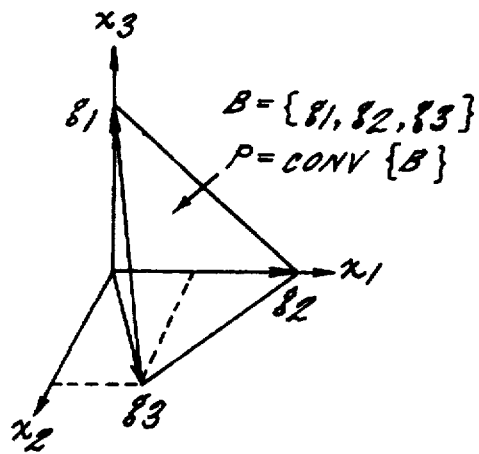
FIGS. 9A and B diagrammatically illustrate a bundle, a convex hull and an affine manifold in accordance with an alternate embodiment.
Figure 9B:
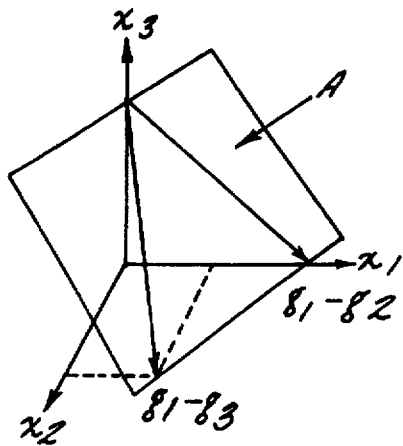
Figure 10:
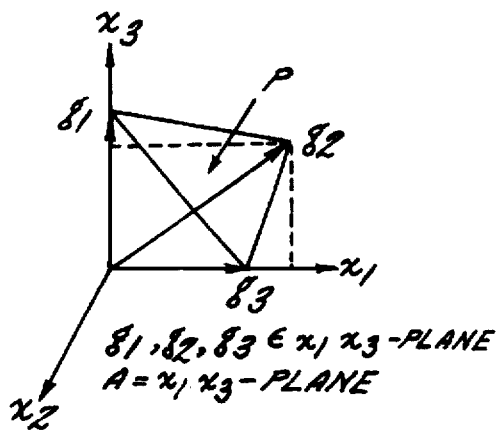
FIG. 10 diagrammatically illustrates the affine manifold containing the origin, causing a zero projection.

In accordance with this embodiment of the present invention, a reduced complexity bundle method is presented which computes a direction by finding a hyperplane that separates the origin from an affine manifold of P. Referring now to FIGS. 9A and B, illustrate an example of a bundle B, the convex hull P, and the affine manifold A. A hyperplane separating the origin and affine manifold A also separates the origin and convex hull P since $P \subset A$. For any $g \in B$, the component of g normal to affine manifold A is a trial direction normal to a hyperplane separating the origin and affine manifold A. This projection requires $O(nb+b^2)$ computations using a recursion relation, such as described in an article entitled "The Gradient Projection Method for Nonlinear Programming, Part I, Linear Constraints", by L. B. Rosen, J. Soc. Indust. Appl. Meth., 8, pp. 181–217, 1960, which is incorporated herein by reference. Referring to FIG. 10, if the projection is zero, then affine manifold A contains the origin and a computationally simple ε-optimality test determines if convex hull P contains the origin. If convex hull P does not contain the origin, a separating hyperplane is computed by re-projecting any $g \in B$ onto the affine manifold of an appropriate face of convex hull P (this face is the $g^1g^3$-face in FIG. 10), requiring $O(nb+b^2)$ computations. In the rare case of degeneracy, a direction is found in $O(nb+b^3)$ computations in the worst case using a method similar that described in "The Gradient Projection Method for Nonlinear Programming, Part I, Linear Constraints", by L. B. Rosen, J. Soc. Indust. Appl. Meth., 8, pp. 181–217, 1960. This algorithm will always finds a hyperplane separating the origin and convex hull P or detects an ε-optimal point, thus maintaining global convergence of the bundle method. A significant improvement of the method of the present invention, is the reduction in computational time in finding a direction from $O(nb+b^3)$ to $O(nb+b^2)$, thus making the bundle method of the present invention much faster, especially for large problems than that of the prior art. The method can also be used to maximize the dual function of a mixed-integer scheduling problem, e.g., the unit commitment and economic dispatch of a power system, where the dual function is nonsmooth and concave.

Prior to describing the improvement of the present invention, the prior art bundle method is described. The prior art bundle methods employ a concept referred to as ε-subdifferential, which is defined as:

$$\partial_\epsilon f(x) = \{g \in R^n : f(y) \leq f(x) + g^T(y-x) - \epsilon, \forall y \in R^n\} \quad (23)$$

and is the union of all subgradients at points in a neighborhood of the current iteration point x. Points in $\partial_\epsilon f(x)$ are referred to as ε-subgradients. The scaler parameter $\epsilon \geq 0$ specifies the extent of the neighborhood: a larger ε implies a larger neighborhood. The set $\partial_{\epsilon 8} f(x)$ is a nonempty compact convex set in $R^n$. Using the concept of an ε-subdifferential, bundle methods seek an ε-ascent direction d. An ε-ascent direction d is a direction which satisfies $f'_\epsilon(x, d) > 0$, where $f'_\epsilon(x, d)$ is the ε-directional derivative which is given as:

$$f'_\epsilon(x,d) = \inf_{s \in \partial_\epsilon f(x)} s^T d, \quad (24)$$

or, $$f'_\epsilon(x,d) = \sup_{t > 0} \frac{f(x+td) - f(x) - \epsilon}{t} \quad (25)$$

A direction satisfying $f'_\epsilon(x,d) > 0$, if it exists at x, has the following important convergence property, derived from EQUATION 25:

$$f(x+td) > f(x) + \epsilon \text{ for some } t > 0, \quad (26)$$

which states that f increases at least ε along d. Such a direction d exists if and only if $f(x) < f(x^*) - \epsilon$, where $x^*$ is an optimal solution to EQUATION 21. Therefore, if such a d does not exist, then f(x) is within ε of $f(x^*)$ and x is referred to as ε-optimal. A hyperplane in $R^n$ normal to an ε-ascent direction strictly separates the origin from $\partial_\epsilon f$-the development of improvement of the present invention relies on this geometric interpretation.

The availability of only one subgradient at each point implies unavailability of the complete ε-subdifferential. The unavailability of the ε-subdifferential resulted in the bundle idea. In summary, at each iteration, accumulate ε-subgradients of the iterate in a bundle B, and substitute for $\partial_\epsilon f$ the convex hull P of the elements in the bundle. The set P provides an inner polyhedral approximation to $\partial_\epsilon f$, and the bundle method iteratively adds to bundle B until convex hull P is a sufficient approximation. The prior art bundle method basically followed the following four steps.

(1) At a new iteration point x, initialize the bundle to $B = \{g_1\}$, $g_1 \in \partial f(x)$.

(2) For any given bundle B and corresponding convex hull P, obtain a hyperplane separating the origin and $P = \text{conv}\{B\}$, where the normal to the hyperplane yields a trial direction d. This d should satisfy $\inf_{s \in P}\{S^T d\} > 0$ (analogous to $f'_\epsilon > 0$), or equivalently, $$g^T d > 0 \text{ for all } g \in B \quad (27)$$

Conventional bundle methods find a direction d satisfying EQUATION 27 by maximizing $\inf_{s \in P}\{S^T d\}$ subject to $\|d\|=1$, or equivalently finding the point in convex hull P closest to the origin. If a direction d satisfying EQUATION 27 does not exist, then convex hull P contains the origin and x is an ε-optimal point since $0 \in P \subset \partial_\epsilon f$.

(3) After computation of a trial direction, determine if there exists a t satisfying EQUATION 26 by performing a line search along d. If such a t exists, d is an ε-ascent direction.

(4) Update the iteration point and go to step (1) above. Otherwise, find a subgradient g ∈ ∂f(x+td) for some t where g satisfies g ∈ ∂$_\epsilon$f(x) and $g^T d \leq 0$, and add such a g to the bundle to improve convex hull P and go to step (2) above. Repeat the process until convex hull P contains the origin.

Computing a trial direction in step (2) involves solving a quadratic programming subproblem (see, "Convex Analysis and Minimization Algorithms II", by J.-B. Hiriart-Urruty and C. Lemarechal, Spfinger-Verlar, Berlin, 1993, which is incorporated herein by reference, for formulation thereof) to obtain subgradient multipliers and involves computing the linear combination of the subgradients, each weighted by its respective multiplier, to obtain the direction. The quadratic programming subproblem requires O(b3) computations (e.g., using the method in "Interior Path Following Primal-Dual Algorithm, Part II: Convex Quadratic Programming", by D. C. Monteiro and I. Adler, Math. Prog., 44, 1989, which is incorporated herein by reference), where b is the number of subgradients in the bundle, and the linear combination requires O(nb) computations. The total of O(nb+b$^3$) computations for computing a trial direction, where the b$^3$ term usually dominates, thus encumbers the optimization process for problems with many variables (i. e., problems with large n).

The improvement of the present invention, lies in a new step (2)', whereby steps (1), (3) and (4) in the present invention are the same as described above with regard to the prior art. The new step (2)' comprises three parts as follows.

(2a)' Find a hyperplane separating the origin and affine manifold A of convex hull P, and project any g ∈ B onto A$^\perp$, the subspace normal to A. If the projection d is not zero, go to step (3).

(2b)' If the projection is zero (indicating affine manifold A contains the origin), perform an ε-optimality test to determine if convex hull P contains the origin. If convex hull P contains the origin, then stop.

(2c)' If the projection is zero and convex hull P does not contain the origin, compute a trial direction by re-projecting any g ∈ B onto the subspace normal to the affine manifold of an appropriate face of P. Check for degeneracy of the projection direction d. If not degenerate, go to step (3); otherwise, use a recursion relation, such as described in an article entitled "The Gradient Projection Method for Nonlinear Programming, Part I, Linear Constraints", by L. B. Rosen, J. Soc. Indust. Appl. Meth., 8, pp. 181–217, 1960 to compute a valid direction d and go to step (3) or detect an ε-optimal point and stop.

Herein the notation $B_b$ and $P_b$ are used to represent a bundle with b elements and its convex hull, respectively.

The affine manifold of P is expressed in matrix form as: for bundle $B_b = \{g_1, g_2, \ldots, g_b\}$, $b \geq 2$, $P_b = \text{conv}\{B_b\}$, $$A(P_b) = \left\{ x : x = g_1 - S_b^T \sigma, S_b = \begin{bmatrix} g_1^T - g_2^T \\ g_1^T - g_3^T \\ \vdots \\ g_1^T - g_b^T \end{bmatrix}, g_i \in B, \sigma \in R^{b-1} \right\} \quad (28)$$

Note that when a subgradient g+1 is added to $B_b$, the row vector $g_1^T - b_{b+1}^T$ is added to $S_b$ to form $S_{b+1}$. If the rows of $S_b$ are independent, i.e. the subgradients in $B_b$ are affine independent, then using the recursion relation gives the component of g ∈ $B_b$ normal to affine manifold A by the following projection:

$$d = [I - S_b^T (S_b S_b^T)^{-1} S_b] g \quad (29)$$

The inverse in EQUATION 29 exists since $S_b$ is full rank. The direction d in EQUATION 29 satisfies EQUATION 27 and is a desired trial direction.

In accordance with a first theorem of this embodiment, suppose that the subgradients in $B_b = \{g_1, g_2, \ldots, g_b\}$ are affine independent so that $S_b$ in EQUATION 28 is full rank. If the projection of g ∈ $B_b$ onto $S_b x = c$, given by EQUATION 29, is not zero, then d satisfies $g^T d > 0$ for all g ∈ $B_b$.

Accordingly, using the direction of EQUATION 29 in step (2) of the prior art bundle method results in the affine independence of the subgradients in $B_b$, thus meeting the condition of the above theorem. The bundle is initialized to $B_1 = \{g_1\}$ in step (1), and the element in $B_1$ is affine independent. Therefore, we need to show that each subsequent addition to the bundle maintains affine independence for all g ∈ $B_b$. Assuming that the elements of $B_b$ are affine independent, d is computed in EQUATION 29 using this $B_b$, and this d is non-zero. After computing this d in step (2), the algorithm then proceeds to step (3) and performs a line search along d. Further, assuming that step (3) determines f can not be increased by ε, and g+1 is added to $B_b$ as in step (3) (it will be remembered that g+1 satisfies $g_{b+1}^T d \leq 0$). The row vector $(g_1 - g_{b+1})^T$ is added to $S_b$ and the resulting $S_{b+1}$ must be full rank for the subgradients in $B_{b+1}$ to be affine independent. The term $(g_{1-g_{b+1}})^T d$ equals $d^T d - g_{b+1}^T d \neq 0$ and $(g_1 - g_{b+1})^T$ is not in the range space of $S_b$; therefore $S_{b+1}$ is full rank and $B_{b+1} = \{g_1, g_2, \ldots, g_b, g_{b+1}\}$ is affine independent.

In accordance with a second theorem of this embodiment, if $g_{b+1}$ satisfies $g_{b+1}^T d \leq 0$, where $d \neq 0$ is computed in EQUATION 29 and $\{g_1, g_2, \ldots, g_b\}$ is affine independent, then adding the row $(g_1 - g_{b+1})^T$ to $S_b$ keeps $S_{b+1}$ full rank and $\{g_1, g_2, \ldots, g_b, g_{b+1}\}$ is affine independent.

Accordingly, the trial direction computation of d in EQUATION 29 requires O(nb+b$^2$) computations. Computing the inverse of the (b−1)×(b−1) matrix $S_b S_b^T$ in EQUATION 29 normally requires O(b$^3$) computations. However, the value of $(S_{b-1} S_{b-1}^T)^{-1}$ is available from the previous projection. Using this value, the algorithm computes $(S_b S_b^T)^{-1}$ in O(nb+b$^2$) computations use a recursion relation, such as described in an article entitled "The Gradient Projection Method for Nonlinear Programming, Part I, Linear Constraints", by L. B. Rosen, J. Soc. Indust. Appl. Meth., 8, pp. 181–217, 1960. The remaining multiplications and additions in EQUATION 29 require an additional 2n(b−1)+(b−1)$^2$+n≈2nb+b$^2$ additions and 2n(b−1)+(b−1)$^2$≈2nb+b$^2$ multiplications using the following precedence:

$$d = g - \{S_b^T [(S_b S_b^T)^{-1} (S_b g)]\} \quad (32)$$

Therefore, the improved bundle method of the present invention computes the trial direction of EQUATION 32 in O(nb+b$^2$) computations, as compared to O(nb+b$^3$) computations in the prior art bundle method discussed hereinbefore. This reduction in computation time is a significant improvement over the prior art. The trial direction of EQUATION 32 is not always the same as the trial directions found by conventional prior art bundle methods, but the direction of EQUATION 32 maintains the important convergence property in EQUATION 26.

Therefore, for the subgradients in $B_b$ affine independent, the algorithm of the present invention computes a trial direction in O(nb+b$^2$) computations by projecting a subgradient in $B_b$ onto the affine manifold A. Furthermore, using these trial directions produces a bundle containing affine independent subgradients, at least until a zero projection occurs.

The condition for an ε-optimal point is that there does not exist a d satisfying the system of b linear strict inequalities in EQUATION 27. A sufficient condition for a system of linear strict inequalities having no solution: there exists a non-negative $\lambda_i$, with at least one $\lambda_i > 0$, such that:

$$\sum_{i=1}^{b} \lambda_i g_i = 0, B_b = \{g_1, g_2, \ldots, g_b\} \quad (33)$$

or equivalently, there exists $\lambda_i$, either all non-negative or all non-positive, with at least one $\lambda_i \neq 0$, such that EQUATION 33 is satisfied.

The condition of EQUATION 27 is satisfied when d in EQUATION 29 is not zero, as stated in the first theorem of this embodiment. Therefore, the optimality conditions need to be checked only when a zero projection occurs.

When d=0, $$g = S_b^T \sigma \quad (34)$$

which states that there exists $\sigma$ satisfying EQUATION 34. Also, $\sigma$ is not zero since g is not zero. Furthermore, $\sigma$ is unique since $S_b^T$ is full rank. Using the expression for $S_b$ in EQUATION 28, EQUATION 34 is equivalent to:

$$\sum_{i=1}^{b} \lambda_i g_i = 0, B_b = \{g_1, g_2, \ldots, g_b\} \quad (35)$$

where $$\lambda_1 = 1 - \sum_{i=1}^{b-1} \sigma_i \quad (36)$$

$$\lambda_i = \sigma_{i-1}, i = 2, 3, \ldots, b \quad (37)$$

Since EQUATION 34 uniquely determines $\sigma$, the set $\{c\lambda; c \in R, \lambda$ given in EQUATIONS 36 and 37$\}$ contains the complete set of values satisfying EQUATION 35. Thus, if the components $\lambda_i$, of $\lambda$ in EQUATIONS 36 and 37 are either all non-negative or all non-positive (at least one $\lambda_i$, must be non-zero by EQUATION 36), then an $\epsilon$-optimal point is detected.

It will be appreciated that the value of $\sigma$ was actually computed prior to this point. More specifically, solving for $\sigma$ in EQUATION 34 gives $\sigma = (S_b S_b^T)^{-1} S_b g$, which the algorithm already computed in EQUATION 32. Therefore, to check for an $\epsilon$-optimal point, compute $\lambda$ in EQUATIONS 36 and 37.

Therefore, the computational test for an $\epsilon$-optimal point is as follows: when d=0 in EQUATION 32, compute $\lambda$ according to EQUATIONS 36 and 37, where $\sigma = (S_b S_b^T)^{-1} S_b g$, was previously computed in EQUATION 32. If $\lambda_i \geq 0$ for all $\lambda_i$, or $\lambda_i \leq 0$ for all $\lambda_i$, then x is an $\epsilon$-optimal point.

A problem arises with the occurrence of a zero projection when the current iteration point x is not at an $\epsilon$-optimal point, i.e. $0 \in A$ and $0 \notin P_b$. In order to resolve this problem, a re-projection onto the affine manifold of a face of $P_b$ produces a separating hyperplane. If $B_b$ is affine independent, a face of $P_b$ is defined as $\overline{P}_{b-1} = \text{conv} \{\overline{B}_{b-1}\}$, where $\overline{B}_{b-1} = \{B_b - g_j\}$ for some $g_j \in B_b$. A re-projection of some $g \in \overline{B}_{b-1}$ onto $A(\overline{P}_{b-1})$ produces a direction d satisfying the conditions $g^T d > 0$ for all $g \in \overline{B}_{b-1}$. For d to satisfy EQUATION 27 and be a trial direction, $g_j$ must be selected such that the condition $g_j^T d > 0$ is also satisfied. The $g_j$ to select is some $g_j \in B_b$ that satisfies $\lambda_j < 0$ in EQUATIONS 36 and 37. The following theorem states this result. If d=0 in EQUATION 29 and x is not an $\epsilon$-optimal point, a hyperplane specified by d which separates $P_b$ and the origin is found by following these steps:

(A) compute $\sigma = (S_b S_b^T)^{-1} S_b g$, (B) let $\lambda_i = \sigma_{i-1}$ for i=2,3,...,b, and $$\lambda_1 = 1 - \sum_{i=2}^{b} \lambda_i,$$

(C) for any one $\lambda_j < 0$, form $\overline{B}_{b-1} = \{B_b - g_j\}$.

If there is only one subgradient in $\overline{B}_{b-1}$, let $\overline{d} = g$, $g \in \overline{B}_{b-1}$. Otherwise, re-project according to $\overline{d} = [I - \overline{S}_{b-1}^T (\overline{S}_{b-1} \overline{S}_{b-1}^T)^{-1} \overline{S}_{b-1}] \overline{g}$ where $\overline{g} \in \overline{B}_{b-1}$ and $\overline{S}_{b-1}$ has rows $g_K^T - g_i^T$, for one $g_k \in \overline{B}_{b-1}$, and for all $g_i \in \overline{B}_{b-1} - g_k$. This direction will satisfy $\overline{d}^T g > 0$ for all $g \in B_b$. Furthermore, the re-projection will always be non-zero.

Using a recursion relation, such as described in an article entitled "The Gradient Projection Method for Nonlinear Programming, Part I, Linear Constraints", by L. B. Rosen, J. Soc. Indust. Appl. Meth., 8, pp. 181-217, 1960 for computing $(\overline{S}_{b-1} \overline{S}_{b-1}^T)^{-1}$ from $(S_b S_b^T)^{-1}$ the projection in the above theorem requires $O(nb+b^2)$ computations. Also it will be noted that the next subgradient $g_{b+1}$ added to this bundle will be affine independent of $\{B_b - g_j\}$, but $B_{b+1}$ will not necessarily be affine independent.

Figure 11:
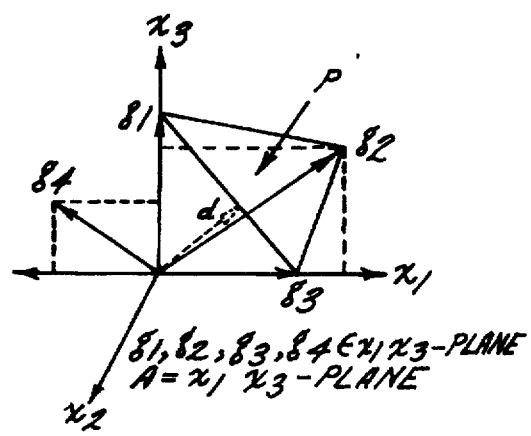
FIG. 11 diagrammatically illustrates a bundle with affine dependent elements.

After a zero projection and re-projection as described above, any subsequent additions to the bundle can cause the bundle to contain affine dependent subgradients, in which case $S_b$ is not full rank and the inverse in EQUATION 29 does not exist. Referring to FIG. 11, for the example, suppose $B_3 = \{g_1, g_2, g_3\}$, in which case a zero projection onto A results. Then, a re-projection is performed by dropping $g_2$, which produces d in FIG. 11. Now, the bundle method of the present invention picks up $g_4$ to add to the bundle (it will be noted, that $g_4^T d \leq 0$ as required in step (3)). Clearly, the A resulting from $B_4 = \{g_1, g_2, g_3, g_4\}$ can be expressed in terms of any three of the four subgradients; therefore, the new bundle is not affine independent.

To resolve the problem of affine dependence of some bundle $B_b$, the objective is to express A in terms of an affine independent subset of $B_b$ and then project onto A as before. To this end, the bundle $B_b$ is split into two "sub-bundles": a set of affine independent subgradients $B_{b,1}^I$ and dependent subgradients $B_{b,b-1}^D$. The set $B_{b,1}^I$ is a "maximum" set of independent subgradients, i.e., $A(P_b) = A(P_{b,1}^I)$ where $P_{b,1}^I = \text{conv}\{B_{b,1}^I\}$. The advantage of this split is that $A(P_b)$ is represented based on the set of affine independent subgradients $B_{b,1}^I$: for $B_b = \{g_1, g_2, \ldots, g_b\}, B_{b,1}^I = \{g_1, g_2, \ldots, g_l\}$, and $2 \leq l \leq b$, $$A(P_b) = x: x = g_1 - (S_{b,l}^I)^T \sigma, S_{b,1}^I = \begin{bmatrix} g_1^T - g_2^T \\ g_1^T - g_3^T \\ \cdot \\ \cdot \\ \cdot \\ g_1^T - g_l^T \end{bmatrix}, \sigma \in R^{l-1} \quad (47)$$

It will be noted that $S_{b,1}^I$ is full rank. The projection onto A is performed using:

$$d = [I - (S_{b,1}^I)^T (S_{b,1}^I (S_{b,1}^I)^T)^{-1} S_{b,1}^I] g_1 \quad (48)$$

and the inverse above exists.

Sub-bundles are initialized after the first zero projection of the current iteration, where the re-projection resulted in $\overline{B}_{b-1,1-1} = \{B_{b-1,1}^I - g_j\}$, and after a new subgradient $g_b$ is added to $B_b$. As stated previously, $g_b$ is affine independent of $\{B_{b-1} - g_j\}$; therefore, the initialization of $B_{b,1}^I = \{B_{b-1,1}^I - g_j\} \cup g_b$ is performed. Then, the b-1 remaining elements in $B_b$ must be put in $B_{b,1}{}'$ if the element is affine independent of $B_{b,1}{}'$. For each $g_i \in \{B_b - B_{b,1}{}'\}$, the test is as follows: if $[I-(S_{b,1}{}')^T[(S_{b,1}{}')(S_{b,1}{}')^T]^{-1}S_{b,1}{}'](g_1-g_i) \neq 0$, then $g_i$ is affine independent of $B_{b,1}{}'$, and $g_i$ is added to $B_{b,1}{}'$. Otherwise, $g_i$ is affine dependent Of $B_{b,1}{}'$ and $g_i$ is to $B_{b-1}{}^D$ ($B_{b-1}{}^D$ added to $B_{b-1}{}^D = \{0\}$). The next steps to follow are the same as before with $B_b$ replaced with $B_{b,1}{}'$.

Another complication that the algorithm may encounter is degeneracy. For given sub-bundles $B_1{}'$ and $B_{b-1}{}^D$, the projection in EQUATION 48 assures that $g^T d > 0$ for all $g \in B_1{}'$. It is also usually the case that this d satisfies EQUATION 27 and is a trial direction. If, however, $g^T d \leq 0$ for some $g \in B_{b-1}{}^D$, then d is not a valid trial direction and degeneracy results.

In the unusual case that degeneracy occurs, a direction is found by solving the following linear program:

$$\max_{z,d} z \quad (49)$$

$$g_i^T d \geq z \; i = 1, 2, \ldots, b. \quad (50)$$

This linear program does not necessarily have to be solved completely. For example, if a simplex method is used, a starting feasible (degenerate) solution would be $d=0$ and $z=0$, and the simplex method would only need to be iterated until $z > 0$. If $d=0$ is the optimal solution to EQUATIONS 49 and 50, then the current iterate is an $\epsilon$-optimal point.

The reduced complexity bundle method of the present invention reduces the number of computations in finding a hyperplane separating the origin and the convex hull of the bundle elements. Prior art conventional bundle methods require $O(nb+b^3)$ computations, where n is the number of variables, b is the number of $\epsilon$-subgradients in the bundle, and the $b^3$ term usually dominates. The present method requires $O(n\bar{b}+\bar{b}^2)$ computations (except when degeneracy occurs), where $\bar{b}$ is the number of affine independent $\epsilon$-subgradients in the bundle ($\bar{b} \leq b$). The reduced complexity in finding a separating hyperplane makes the bundle method of the present invention much faster than the prior art bundle methods, especially for large problems. The present invention includes an $\epsilon$-optimality test and maintains global convergence.

In accordance with the present invention, a method for scheduling a sequence of events which are subject to a plurality of constraints employs one of the above embodiments. The events are scheduled in accordance with the determined schedule. The calculations are preferably performed on a computer as discussed hereinbefore. Further, the computer may be connected to robotics or other automation systems, whereby the scheduling is perform automatically in accordance with the determined schedule. The determined schedule may also be displayed on a computer screen for implementation by, for example manufacturing personnel. The method of the present invention may also be implemented to re-schedule a sequence of events when a constraint or situation changes unexpectantly. While the above examples of the present invention have been directed generally to scheduling a manufacturing process, such scheduling methods are also applicable to asset allocation, material control, inventory control and other applications requiring solutions to integer optimization problems.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method for scheduling a sequence of events which are subject to a plurality of constraints, comprising the steps of:

defining the events and constraints in terms of an integer programming expression;

applying Lagrangian relaxation to the integer programming expression to form a Lagrangian dual function;

solving the Lagrangian dual function using a facet ascending algorithm, said facet ascending algorithm calculating an intersection of adjacent facet and moving along the facets on the intersection;

scheduling the sequence of events in accordance with the resolved Lagrangian dual function; and performing the events in response to said schedule.

2. The method of claim 1 wherein said step of solving the Lagrangian dual function using said facet ascending algorithm, comprises the steps of:

(1) performing a line search of the Lagrangian dual function along a direction of ascent;

(2) updating the Lagrange multipliers based on the line search results;

(3) locating a subspace formed by the intersection of facets at the updated Lagrange multipliers;

(4) determining a direction of ascent within the subspace formed by the intersection of facets; and repeating steps (1)–(4) until a stopping criteria is met.

3. The method of claim 1 wherein:

said integer programming expression comprises $$IP: \min_{x^l \leq x \leq x^u} J_{IP} \equiv \sum_{i=1}^{I} J_i(x_i),$$

subject to $$\sum_{i=1}^{I} H_{ij}(x_i) = 0, j = 1, \ldots, m,$$

$$h_{ik}(x_i) = 0, i = 1, \ldots, I; k = 1, \ldots, K_i,$$

and $$x_i \in Z^{n_i},$$

where $J_i(x_i)$, $H_{ij}(x_i)$, and $h_{ik}(x_i)$ are real-valued functions that map $Z^{n_i} \to R$.

$$x = \begin{bmatrix} x_1 \\ x_2 \\ \cdot \\ \cdot \\ \cdot \\ x_I \end{bmatrix}$$

is an $n \times 1$ vector of decision variables with $n = \sum_{i=1}^{I} n_i$ and lower and upper bounds $x^l$ and $x^u$, respectively, and Z is a set of integers;

said Lagrangian dual function comprises an expression $$J_{LD} \equiv \max_{u} J_{LR}(u)$$

where $$J_{LR}(u) \equiv \min_{x^l \leq x \leq x^u, x \in Z^n} \left[ \sum_{i=1}^{I} J_i(x_i) + \sum_{j=1}^{m} u_j \sum_{i=1}^{I} H_{ij}(x_i) \right],$$

subject to $h_{ik}(x_i)=0$, $i=1, \ldots, I$; $k=1, \ldots, K_i$; and
said step solving the Lagrangian dual function using said facet ascending algorithm comprises the steps of,
 (1) initializing parameters
  (a) set k=0,
  (b) initialize $u^0$,
  (c) compute a subgradient $g(u^0)$, and
  (d) set $d^0 = g(u^0)$;
 (2) performing a line search along $d^k$ to obtain $\alpha_1$, $\alpha_2$, and $\alpha^*$;
 (3) updating u: $u^{k+1}=u^k+\alpha^* d^k$,
 (4) stopping when a stopping criteria is met,
 (5) from points $u_a=u^k+\alpha_1 d^k$ and $u_b=u^k+\alpha_2 d^k$, where $\alpha_1$ and $\alpha_2$ result from the line search of step (2) at a current iteration, initialize a matrix $\hat{S}=[g_a{}^T-g_b{}^T]$, where $g_a=g(u_a)$ and $g_b=g(u_b)$,
 (6) evaluating $d=[I-\hat{S}^T(\hat{S}^T)^{-1}\hat{S}]g_a$, if d=0,
  (a) solving $\hat{S}^T \mu = g_a$,
  (b) letting $\lambda_i = \mu_i$ for $i \in \hat{D}-a$, $\lambda_a = 1 - \Sigma_{i \in \hat{D}-a} \lambda_i$,
  (c) for $w \in \hat{D}$ such that $\lambda_w < 0$, if $w \neq \alpha$, removing a row $g_a{}^T - g_w{}^T$ from $\hat{S}$ and forming $d=[I-\hat{S}^T(\hat{S}^T)^{-1}\hat{S}]g_a$, if $w=\alpha$, subtracting a first row of $\hat{S}$ from all other rows and subsequently removing the first row, then forming $d=[I-\hat{S}^T(\hat{S}^T)^{-1}\hat{S}]g_b$,
 (7) from $u^{k+1}$, moving a step $\epsilon$ in a direction d and computing $J_{LR}(u^{k+1}+\epsilon d)$ and a subgradient $g_v = g(u^{k+1}+\epsilon d)$, if $g_v{}^T d = d^T d$, setting $d^{k+1}=d$, incrementing k by 1, and go to step (2), and
 (8) adding a row $(g_a - g_v)^T$ to $\hat{S}$ and go to step (6).

4. The method of claim 3 wherein said step of stopping when said stopping criteria is met includes using heuristics to obtain a primal solution.

5. The method of claim 2 wherein said stopping criteria includes using heuristics to obtain a primal solution.

6. A system for scheduling a sequence of events which are subject to a plurality of constraints comprising:
 signal processor for processing information of the events and constraints, and having memory for storing signals including signals defining an executable algorithm for,
  (a) defining the events and constraints in terms of an integer programming expression,
  (b) applying Lagrangian relaxation to the integer programming expression to form a Lagrangian dual function,
  (c) solving the Lagrangian dual function using a facet ascending algorithm stored in said memory means, said facet ascending algorithm calculating an intersection of adjacent facets and moving along the facets on the intersection, and
  (d) generating signals indicative of a schedule of the sequence of events in accordance with the resolved Lagrangian dual function; and
 an automated device responsive to said signals indicative of said schedule for automatically performing the events in accordance with said schedule.

7. The system of claim 6 wherein said solving the Lagrangian dual function using said facet ascending algorithm, comprises:
 (1) performing a line search of the Lagrangian dual function along a direction of ascent;
 (2) updating the Lagrange multipliers based on the line search results;
 (3) locating a subspace formed by the intersection of facets at the updated Lagrange multipliers;
 (4) determining a direction of ascent within the subspace formed by the intersection of facets; and
 repeating (1)-(4) until a stopping criteria is met.

8. The system of claim 6 wherein:
 said integer programming expression comprises $$IP: \min_{x^l \leq x \leq x^u} \quad J_{IP} \equiv \sum_{i=1}^{I} J_i(X_i),$$

subject to $$\sum_{i=1}^{I} H_{ij}(x_i) = 0, j = 1, \ldots, m,$$

$$h_{ik}(x_i) = 0, i = 1, \ldots, I; k = 1, \ldots, K_i,$$

and $$x_i \in Z^{n_i},$$

where $J_i(x_i)$, $H_{ij}(x_i)$, and $h_{ik}(x_i)$ are real-valued functions that map $Z^{n_i} \to R$, $$x = \begin{bmatrix} x_1 \\ x_2 \\ \cdot \\ \cdot \\ \cdot \\ x_I \end{bmatrix}$$

is an n×1 vector of decision variables with $n=\Sigma^I_{i=1} n_i$ and lower and upper bounds $x^l$ and $x^u$, respectively, and Z is a set of integers;

said Lagrangian dual function comprises an expression $$J_{LD} \equiv \max_u J_{LR}(u)$$

where $$J_{LR}(u) \equiv \min_{x^l \leq x \leq x^u, x \in Z^n} \left[ \sum_{i=1}^{I} J_i(x_i) + \sum_{j=1}^{m} u_j \sum_{i=1}^{I} H_{ij}(x_i) \right],$$

subject to $h_{ik}(x_i)=0$, $i=1, \ldots, I$; $K=1, \ldots, K_i$; and
said solving the Lagrangian dual function using said facet ascending algorithm comprises the steps of,
 (1) initializing parameters
  (a) set k=0,
  (b) initialize $u^0$,
  (c) compute a subgradient $g(u^0)$, and
  (d) set $d^0=g(u^0)$;
 (2) performing a line search along $d^k$ to obtain $\alpha_1$, $\alpha_2$, and $\alpha^*$;
 (3) updating u: $u^{k+1}=u^k+\alpha^* d^k$,
 (4) stopping when a stopping criteria is met,
 (5) from points $u_a=u^k+\alpha_1 d^k$ and $u_b=u^k+\alpha_2 d^k$, where $\alpha_1$ and $\alpha_2$ result from the line search at a current iteration, initialize a matrix $\hat{S}=[g_a{}^T-g_b{}^T]$, where $g_a=g(u_a)$ and $g_b=g(u_b)$,
 (6) evaluating $d=[I-\hat{S}^T(\hat{S}^T)^{-1}\hat{S}]g_a$, if d=0,
  (a) solving $\hat{S}^T \mu = g_a$,
  (b) letting $\lambda_i = \mu_i$ for $i \in \hat{D}-a$, $\lambda_a = 1 - \Sigma_{i \in \hat{D}-a} \lambda_i$,
  (c) for $w \in \hat{D}$ such that $\lambda_w < 0$, if $w \neq \alpha$, removing a row $g_a{}^T - g_w{}^T$ from $\hat{S}$ and forming $d=[I-\hat{S}^T(\hat{S}^T)^{-1}\hat{S}]g_a$, if w=α, subtracting a first row of $\hat{S}$ from all other rows and subsequently removing the first row, then forming $d=[I-\hat{S}^T(\hat{S}^T)^{-1}\hat{S}]g_b$.

(7) from $u^{k+1}$, moving a step $\epsilon$ in a direction d and computing $J_{LR}(u^{k+1}+\epsilon d)$ and a subgradient $g_v=g(u^{k+1}+\epsilon d)$, if $g_v^T d=d^T d$, setting $d^{k+1}=d$, incrementing k by 1, and go to (2), and (8) adding a row $(g_a-g_v)^T$ to $\hat{S}$ and go to (6).

9. The system of claim 7 wherein said stopping criteria includes using heuristics to obtain a primal solution.

10. The system of claim 8 wherein said stopping criteria includes using heuristics to obtain a primal solution.

11. A system for scheduling a sequence of events which are subject to a plurality of constraints comprising:

signal processor for processing information of the events and constraints, and having memory for storing signals including signals defining an executable algorithm for,
(a) defining the events and constraints in terms of an integer programming expression,
(b) applying Lagrangian relaxation to the integer programming expression to form a Lagrangian dual function,
(c) solving the Lagrangian dual function using a facet ascending algorithm stored in said memory means, said facet ascending algorithm calculating an intersection of adjacent facets and moving along the facets on the intersection, and
(d) generating signals indicative of a schedule of the sequence of events in accordance with the resolved Lagrangian dual function; and a display for generating a display of said schedule in response to said signals indicative thereof.

12. The system of claim 11 wherein said solving the Lagrangian dual function using said facet ascending algorithm, comprises:

(1) performing a line search of the Lagrangian dual function along a direction of ascent;
(2) updating the Lagrange multipliers based on the line search results;
(3) locating a subspace formed by the intersection of facets at the updated Lagrange multipliers;
(4) determining a direction of ascent within the subspace formed by the intersection of facets; and
repeating (1)–(4) until a stopping criteria is met.

13. The system of claim 12 wherein said stopping criteria includes using heuristics to obtain a primal solution.

14. The system of claim 11 wherein:

said integer programming expression comprises $$IP: \min_{x^l \leq x \leq x^u} J_{IP} \equiv \sum_{i=1}^{I} J_i(X_i),$$

subject to $$\sum_{i=1}^{I} H_{ij}(x_i) = 0, j = 1, \ldots, m,$$

$h_{ik}(x_i) = 0, i = 1, \ldots, I; k = 1, \ldots, K_i,$ and $x_i \in Z^{n_i}$, where $J_i(x_i)$, $H_{ij}(x_i)$, and $h_{ik}(x_i)$ are real-valued functions that map $Z^{n_i} \to R$, $$x = \begin{bmatrix} x_1 \\ x_2 \\ \cdot \\ \cdot \\ \cdot \\ x_I \end{bmatrix}$$

is an n×1 vector of decision variables with $n=\sum_{i=1}^{I} n_i$ and lower and upper bounds $x^l$ and $x^u$, respectively, and Z is a set of integers;

said Lagrangian dual function comprises an expression $$J_{LD} \equiv \max_u J_{LR}(u)$$

where $$J_{LR}(u) \equiv \min_{x^l \leq x \leq x^u, x \in Z^n} \left[ \sum_{i=1}^{I} J_i(x_i) + \sum_{j=1}^{m} u_j \sum_{i=1}^{I} H_{ij}(x_i) \right],$$

subject to $h_{ik}(x_i)=0, i=1, \ldots, I; k=1, \ldots, K_i;$ and said solving the Lagrangian dual function using said facet ascending algorithm comprises the steps of,
(1) initializing parameters
  (a) set k=0,
  (b) initialize $u^0$,
  (c) compute a subgradient $g(u^0)$, and
  (d) set $d^0=g(u^0)$;
(2) performing a line search along $d^k$ to obtain $\alpha_1$, $\alpha_2$, and $\alpha^*$;
(3) updating u: $u^{k+1}=u^k+\alpha^* d^k$,
(4) stopping when a stopping criteria is met,
(5) from points $u_a=u^k+\alpha_1 d^k$ and $u_b=u^k+\alpha_2 d^k$, where $\alpha_1$ and $\alpha_2$ result from the line search at a current iteration, initialize a matrix $\hat{S}=[g_a^T-g_b^T]$, where $g_a=g(u_a)$ and $g_b=g(u_b)$,
(6) evaluating $d=[I-\hat{S}^T(\hat{S}^T)^{+1}\hat{S}]g_a$, if d=0,
  (a) solving $\hat{S}^T \mu=g_a$,
  (b) letting $\lambda_i=\mu_i$ for $i \in \hat{D}-\alpha$, $\lambda_\alpha=1-\sum_{i \in \hat{D}-\alpha}\lambda_i$,
  (c) for $w \in \hat{D}$ such that $\lambda_w<0$, if $w \neq \alpha$, removing a row $g_a^T-g_w^T$ from $\hat{S}$ and forming $d=[I-\hat{S}^T(\hat{S}^T)^{-1}\hat{S}]g_a$, if w=α, subtracting a first row of $\hat{S}$ from all other rows and subsequently removing the first row, then forming $d=[I-\hat{S}^T(\hat{S}^T)^{-1}\hat{S}]g_b$,
(7) from $u^{k+1}$, moving a step $\epsilon$ in a direction d and computing $J_{LR}(u^{k+1}+\epsilon d)$ and a subgradient $g_v=g(u^{k+1}+\epsilon d)$, if $g_v^T d=d^T d$, setting $d^{k+1}=d$, incrementing k by 1, and go to (2), and
(8) adding a row $(g_a-g_v)^T$ to $\hat{S}$ and go to (6).

15. The system of claim 13 wherein said stopping criteria includes using heuristics to obtain a primal solution.

16. A method for scheduling a sequence of events which are subject to a plurality of constraints, comprising the steps of:

defining the events and constraints in terms of an integer programming expression;

generating a dual function decoupled by multipliers from said integer programming expression, said dual function is a polyhedral concave function comprised of many facets;

solving the dual function using a facet ascending algorithm, said facet ascending algorithm calculating an intersection of adjacent facets and moving along the facets at the intersection thereof;

scheduling the sequence of events in accordance with the resolved dual functional and performing the events in response to said schedule.

17. The method of claim 16 wherein said step of solving the dual function using said facet ascending algorithm, comprises the steps of:
(1) performing a line search of the dual function along a direction of ascent;
(2) updating the multipliers based on the line search results;
(3) locating a subspace formed by the intersection of the facets at the updated multipliers;
(4) determining a direction of ascent within the subspace formed by the intersection of the facets; and repeating steps (1)–(4) until a stopping criteria is met.

18. The method of claim 17 wherein said stopping criteria includes using heuristics to obtain a primal solution.

19. The system of claim 17 wherein said stopping criteria includes using heuristics to obtain a primal solution.

20. A system for scheduling a sequence of events which are subject to a plurality of constraints comprising:

signal processor for processing information of the events and constraints, and having memory for storing signals including signals defining an executable algorithm for,
(a) defining the events and constraints in terms of an integer programming expression,
(b) generating a dual function decoupled by multipliers from said integer programming expression, said dual function is a polyhedral concave function comprised of many facets,
(c) solving the dual function using a facet ascending algorithm, said facet ascending algorithm calculating an intersection of adjacent facets and moving along the facets at the intersection thereof, and
(d) generating signals indicative of a schedule of the sequence of events in accordance with the resolved dual function; and an automated device responsive to said signals indicative of said schedule for automatically performing the events in accordance with said schedule.

21. The system of claim 20 wherein said solving the dual function using said facet ascending algorithm, comprises:
(1) performing a line search of the dual function along a direction of ascent;
(2) updating the multipliers based on the line search results;
(3) locating a subspace formed by the intersection of the facets at the updated multipliers;
(4) determining a direction of ascent within the subspace formed by the intersection of the facets; and repeating (1)–(4) until a stopping criteria is met.

22. A system for scheduling a sequence of events which are subject to a plurality of constraints comprising:

signal processor for processing information of the events and constraints, and having memory for storing signals including signals defining an executable algorithm for,
(a) defining the events and constraints in terms of an integer programming expression,
(b) generating a dual function decoupled by multipliers from said integer programming expression, said dual function is a polyhedral concave function comprised of many facets,
(c) solving the dual function using a facet ascending algorithm, said facet ascending algorithm calculating an intersection of adjacent facets and moving along the facets at the intersection thereof, and
(d) generating signals indicative of a schedule of the sequence of events in accordance with the resolved dual function; and a display for generating a display of said schedule in response to said signals indicative thereof.

23. The system of claim 22 wherein said solving the dual function using said facet ascending algorithm, comprises:
(1) performing a line search of the dual function along a direction of ascent;
(2) updating the multipliers based on the line search results;
(3) locating subspace forced by the intersection of the facets at the updated multipliers;
(4) determining a direction of ascent within the subspace formed by the intersection of the facets; and repeating (1)–(4) until a stopping criteria is met.

24. The system of claim 23 wherein said stopping criteria includes using heuristics to obtain a primal solution.

25. A method for scheduling a sequence of events which are subject to a plurality of constraints, comprising the steps of:
(1) defining the events and constraints in terms of an expression, said expression defining a nonsmooth concave function;
(2) maximizing said nonsmooth concave function by,
 (a) initializing a bundle of $\epsilon$-subgradients of said nonsmooth concave function at an iteration point, said bundle including a convex hull having an affine manifold, and
 (b) projecting a subgradient of said bundle onto a subspace normal to said affine manifold to locate a trial direction, (i) with a nonzero projection and said trial direction being an $\epsilon$-ascent direction updating said iteration point and repeating steps (a) and (b), (ii) with a nonzero projection and said trial direction being other than an $\epsilon$-ascent direction adding a subgradient to said bundle and repeating steps (a) and (b), (iii) with a zero projection and an absence of said origin in said convex hull repeating step (b), (iv) with a zero projection and said convex hull containing said origin said nonsmooth concave function is maximized;
(3) scheduling the sequence of events in accordance with said maximized nonsmooth concave function; and performing the events in response to said schedule.

26. The method of claim 25 wherein said expression defining said nonsmooth concave function comprises:

$$\max_{x \in R^n} f(x), f: R^n \to R,$$

where f(x) is Lipschitzian, and for a given value x, returns f(x) and exactly one arbitrary subgradient at x, and a subgradient g is a n-vector in a subdifferential $\partial f(x)$ defined as, $$\partial f(x) = \{g \in R^n : f(y) \leq f(x) + g^T(y-x), \forall y \in R^n\}$$

whereby the Lipschitz property of f implies that all subgradients are finite, $\partial f$ exists everywhere, and $\partial f$ is a nonempty compact convex set in $R^n$.

27. The method of claim 26 wherein said affine manifold A of said convex hull P for said bundle $B_b = \{g_1, g_2, \ldots, g_b\}$, $b \geq 2$, $P_b = \text{conv}\{B_b\}$, where g is a subgradient, is expressed in matrix form as:

$$A(P_b) = \left\{ x: x = g_1 - S_b^T \sigma, S_b = \begin{bmatrix} g_1^T - g_2^T \\ g_1^T - g_3^T \\ \cdot \\ \cdot \\ \cdot \\ g_1^T - g_b^T \end{bmatrix}, g_i \in B, \sigma \in R^{i-1} \right\}.$$

28. The method of claim 27 wherein a direction of projection is determined by:

$$d = g - \{S_b^T[(S_bS_b^T)^{-1}(S_bg)]\}$$

29. The method of claim 28 with a zero projection and an absence of said origin in said convex hull repeating step (b) comprises:

computing $\sigma = (S_bS_b^T)^{-1}S_bg$;

letting $\lambda_i = \sigma_{i-1}$ for $i=2,3,\ldots,b$, and $$\lambda_1 = 1 - \sum_{i=2}^{b} \lambda_i;$$

for any one $\lambda_j < 0$, form $\overline{B}_{b-1} = \{B_b - g_j\}$, with only one subgradient in $\overline{B}_{b-1}$ let $\overline{d}=g$, $g \in \overline{B}_{b-1}$; and with other than only one subgradient project said subgradient g by, $d = g\{\overline{S}_{b-1}^T[(\overline{S}_{b-1}\overline{S}_{b-1}^T)^{-1}(\overline{S}_{b-1}g)]\}$ where $\overline{S}_{b-1}$ has rows $(g_k - g_i)^T$, for one $g_k \in \overline{B}_{b-1}$ and for all $g_i \in \overline{B}_{b-1} - g_k$.

30. A system for scheduling a sequence of events which are subject to a plurality of constraints comprising:

signal processor for processing information of the events and constraints, and having memory for storing signals including signals defining an executable algorithm for,
(1) defining the events and constraints in terms of an expression, said expression defining a nonsmooth concave function,
(2) maximizing said nonsmooth concave function by,
 (a) initializing a bundle of ε-subgradients of said nonsmooth concave function at an iteration point, said bundle including a convex hull having an affine manifold, and
 (b) projecting a subgradient of said bundle onto a subspace normal to said affine manifold to locate a trial direction, (i) with a nonzero projection and said trial direction being an ε-ascent direction updating said iteration point and repeating (a) and (b), (ii) with a nonzero projection and said trial direction being other than an ε-ascent direction adding a subgradient to said bundle and repeating (a) and (b), (iii) with a zero projection and an absence of said origin in said convex hull repeating (b), (iv) with a zero projection and said convex hull containing said origin said nonsmooth concave function is maximized; and
(3) generating signals indicative of a schedule of the sequence of events in accordance with said maximized nonsmooth concave function; and an automated device responsive to said signals indicative of said schedule for automatically performing the events in accordance with said schedule.

31. The system of claim 30 wherein said expression defining said nonsmooth concave function comprises:

$$\max f(x), f: R^n \to R,$$
$$x \in R^n$$

where f(x) is Lipschitzian, and for a given value x, returns f(x) and exactly one arbitrary subgradient at x, and a subgradient g is a n-vector in a subdifferential ∂f(x) defined as, $$\partial f(x) = \{g \in R^n : f(y) \leq f(x) + g^T(y-x), \forall y \in R^n\}$$

whereby the Lipschitz property of f implies that all subgradients are finite, ∂f exists everywhere, and ∂f is a nonempty compact convex set in $R^n$.

32. The system of claim 31 wherein said affine manifold A of said convex hull P for said bundle $B_b = \{g_1, g_2, \ldots, g_b\}$, $b \geq 2$, $P_b = \text{conv}\{B_b\}$, where g is a subgradient, is expressed in matrix form as:

$$A(P_b) = \left\{ x: x = g_1 - S_b^T \sigma, S_b = \begin{bmatrix} g_1^T - g_2^T \\ g_1^T - g_3^T \\ \cdot \\ \cdot \\ \cdot \\ g_1^T - g_b^T \end{bmatrix}, g_i \in B, \sigma \in R^{i-1} \right\}.$$

33. The system of claim 32 wherein a direction of projection is determined by:

$$d = g - \{S_b^T[(S_bS_b^T)^{-1}(S_bg)]\}$$

34. The system of claim 33 with a zero projection and an absence of said origin in said convex hull repeating step (b) comprises:

computing $\sigma = (S_bS_b^T)^{-1}S_bg$;

letting $\lambda_i = \sigma_{i-1}$ for $i=2,3,\ldots,b$, and $$\lambda_1 = 1 - \sum_{i=2}^{b} \lambda_i;$$

for any one $\lambda_j < 0$, form $\overline{B}_{b-1} = \{B_b - g_j\}$, with only one subgradient in $\overline{B}_{b-1}$ let $\overline{d}=g$, $g \in \overline{B}_{b-1}$; and with other than only one subgradient project said subgradient g by, $d = g\{\overline{S}_{b-1}^T[(\overline{S}_{b-1}\overline{S}_{b-1}^T)^{-1}(\overline{S}_{b-1}g)]\}$ where $\overline{S}_{b-1}$ has rows $(g_k g_i)^T$, for one $g_k \in \overline{B}_{b-1}$ and for all $g_i \in \overline{B}_{b-1} - g_k$.

35. A system for scheduling a sequence of events which are subject to a plurality of constraints comprising:

signal processor for processing information of the events and constraints, and having memory for storing signals including signals defining an executable algorithm for,
(1) defining the events and constraints in terms of an expression, said expression defining a nonsmooth concave function,
(2) maximizing said nonsmooth concave function by,
 (a) initializing a bundle of ε-subgradients of said nonsmooth concave function at an iteration point, said bundle including a convex hull having an affine manifold, and
 (b) projecting a subgradient of said bundle onto a subspace normal to said affine manifold to locate a trial direction, (i) with a nonzero projection and said trial direction being an ε-ascent direction updating said iteration point and repeating (a) and (b), (ii) with a nonzero projection and said trial direction being other than an ε-ascent direction adding a subgradient to said bundle and repeating (a) and (b), (iii) with a zero projection and an absence of said origin in said convex hull repeating (b), (iv) with a zero projection and said convex hull containing said origin said nonsmooth concave function is maximized; and (3) generating signals indicative of a schedule of the sequence of events in accordance with said maximized nonsmooth concave function; and a display for generating a display of said schedule in response to said signals indicative thereof.

36. The system of claim 35 wherein said expression defining said nonsmooth concave function comprises:

$$\max_{x \in R^n} f(x), f: R^n \to R,$$

where f(x) is Lipschitzian, and for a given value x, returns f(x) and exactly one arbitrary subgradient at x, and a subgradient g is a n-vector in a subdifferential $\partial f(x)$ defined as, $$\partial f(x) = \{g \in R^n : f(y) \leq f(x) + g^T(y-x), \forall y \in R^n\}$$

whereby the Lipschitz property of f implies that all subgradients are finite, $\partial f$ exists everywhere, and $\partial f$ is a nonempty compact convex set in $R^n$.

37. The system of claim 36 wherein said affine manifold A of said convex hull P for said bundle $B_b=\{g_1, g_2, \ldots, g_b\}$, $b \geq 2$, $P_b=\text{conv}\{B_b\}$, where g is a subgradient, is expressed in matrix form as:

$$A(P_b) = \left\{ x: x = g_1 - S_b^T \sigma, S_b = \begin{bmatrix} g_1^T - g_2^T \\ g_1^T - g_3^T \\ \cdot \\ \cdot \\ \cdot \\ g_1^T - g_b^T \end{bmatrix}, g_i \in B, \sigma \in R^{b-1} \right\}$$

38. The system of claim 37 wherein a direction of projection is determined by:

$$d = g - \{S_b^T[(S_b S_b^T)^{-1}(S_b g)]\}$$

39. The system of claim 38 with a zero projection and an absence of said origin in said convex hull repeating step (b) comprises:

computing $\sigma = (S_b S_b^T)^{-1} S_b g$;

letting $\lambda_i = \sigma_{i-1}$ for i=2,3, . . . , b, and $$\lambda_1 = 1 - \sum_{i=2}^{b} \lambda_i;$$

for any one $\lambda_j < 0$, form $\overline{B}_{b-1} = \{B_b - g_i\}$, with only one subgradient in $\overline{B}_{b-1}$ let $\overline{d}=g$, $g \in \overline{B}_{b-1}$; and with other than only one subgradient project said subgradient g by, $d = g\{\overline{S}_{b-1}^T[(\overline{S}_{b-1}\overline{S}_{b-1}^T)^{-1} (\overline{S}_{b-1}g)]\}$ where $\overline{S}_{b-1}$ has rows $(g_k - g_i)^T$, for one $g_k \in \overline{B}_{b-1}$ and for all $g_i \in \overline{B}_{b-1} - g_k$.

* * * * *